United States Patent [19]
Livingston et al.

[11] Patent Number: 4,848,381
[45] Date of Patent: Jul. 18, 1989

[54] CLEAN IN PLACE SYSTEM

[75] Inventors: James W. Livingston; Henry W. Cassady, Jr.; Stephen G. Hosking; Thomas J. Warner; Gary D. Moreland, all of Santa Cruz, Calif.

[73] Assignee: Diversey Corporation, Mississauga, Canada

[21] Appl. No.: 152,877

[22] Filed: Feb. 5, 1988

Related U.S. Application Data

[63] Continuation of Ser. No. 14,552, Feb. 13, 1987.

[51] Int. Cl.$^4$ .............................................. B08B 9/06
[52] U.S. Cl. ..................................... 134/57 R; 134/95; 134/100; 134/169 R; 137/240; 141/90; 222/148
[58] Field of Search ................. 134/57 R, 95, 98, 100, 134/102, 169 R; 366/152, 153; 62/303; 68/207; 137/240; 141/89, 90, 91, 95, 83; 222/148

[56] References Cited

U.S. PATENT DOCUMENTS

| | | | |
|---|---|---|---|
| 2,961,853 | 11/1960 | Cohrt | 62/303 |
| 3,733,840 | 5/1973 | Pearl et al. | 62/303 |
| 3,898,859 | 8/1975 | Duke | 62/303 |
| 3,945,411 | 3/1976 | Skoli et al. | 141/91 |
| 4,058,383 | 11/1977 | Peterson | 62/303 |
| 4,193,818 | 3/1980 | Young et al. | 134/95 |
| 4,353,482 | 10/1982 | Tomlinson et al. | 366/152 |
| 4,417,610 | 11/1983 | Waldstrom et al. | 141/291 |
| 4,571,092 | 2/1986 | Switall | 366/153 |
| 4,683,921 | 8/1987 | Nesser | 141/91 |

Primary Examiner—Philip R. Coe
Assistant Examiner—Corinne M. Reinckens
Attorney, Agent, or Firm—Flehr, Hohbach, Test, Albritton & Herbert

[57] ABSTRACT

A system for cleaning cone/shake makers in place. Cone/shake makers have at least one freezer for making ice cream cones or milk shakes. Each freezer has a product inlet, a product pump for pumping product from the inlet into the freezer, and at least one draw valve for dispensing the product in the freezer. The cleaning system has a mixing tank for mixing water with a cleansing chemical, the mixing tank having a capacity of less than one-fourth the volume of the water and cleansing chemical mixture to be used while cleaning a cone/shake maker. The system controllably provides the cleansing chemical to the mixing tank at a rate corresponding to the rate at which water flow into the mixing tank, thereby making a cleansing chemical solution of predefined concentration on the fly as the mixture is being used to clean the cone/shake maker. The system monitors the conductivity of the water/cleansing solution and generates an error message if the conductivity falls outside a specified range for at least a threshold period of time, thereby providing the user with a warning that the system is having a chemical dispensing problem. The cleaning system includes a draw valve actuator for each of cone/shake maker's draw valves and a controller for opening and closing these draw valves in accordance with a specified schedule.

23 Claims, 29 Drawing Sheets

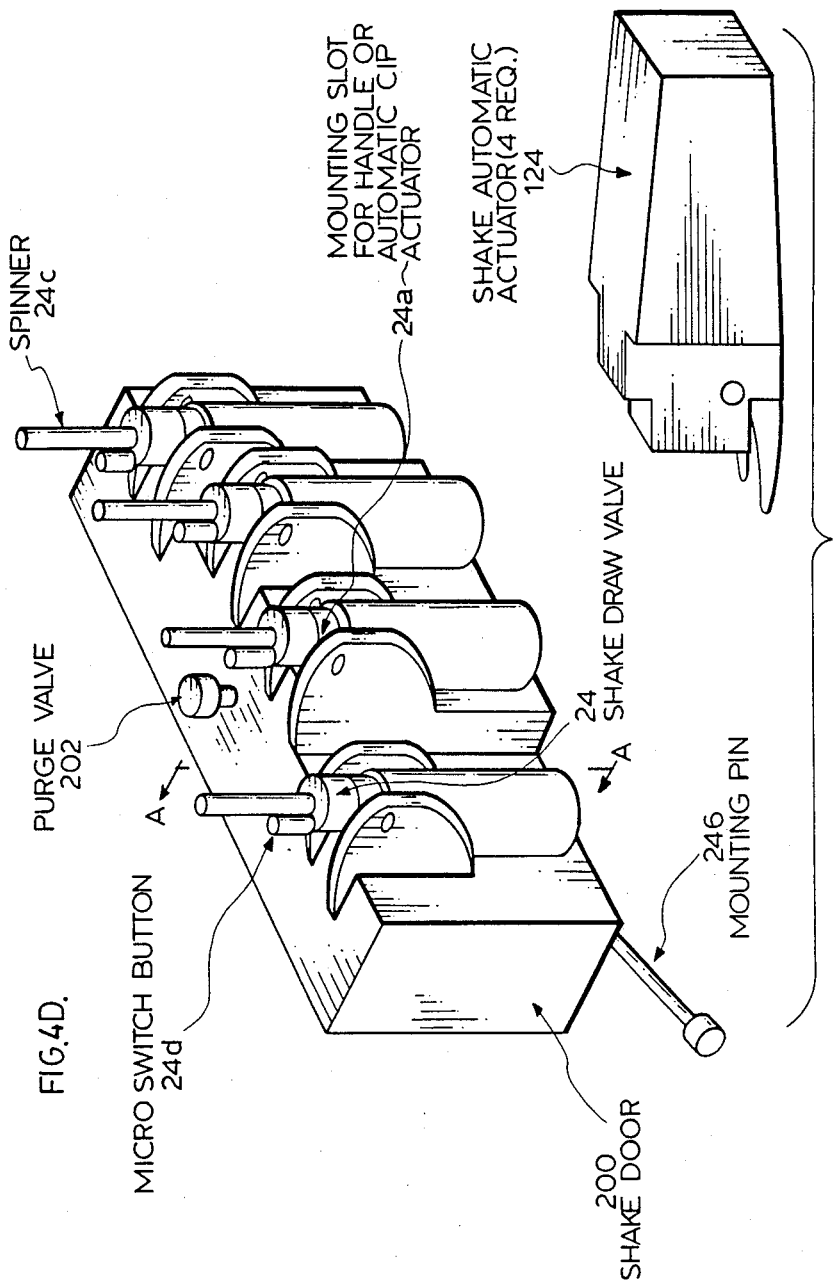

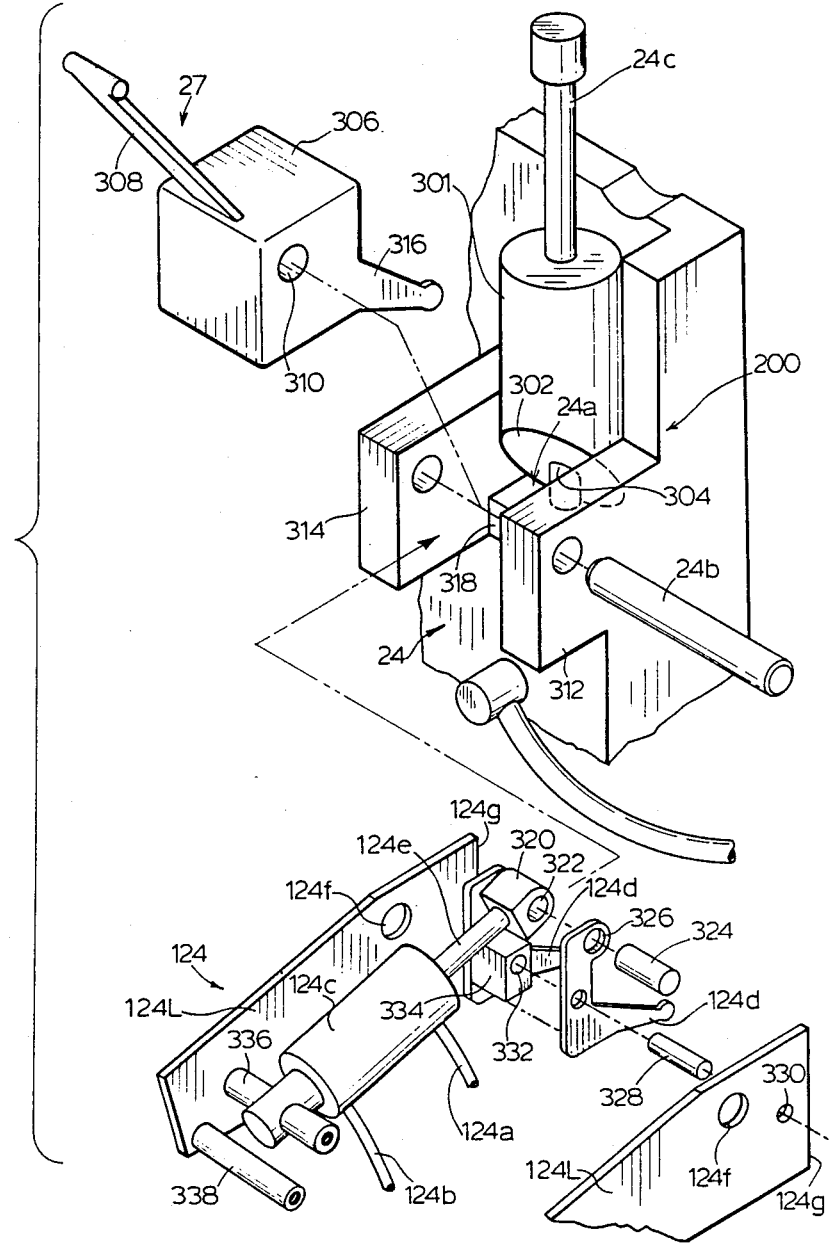

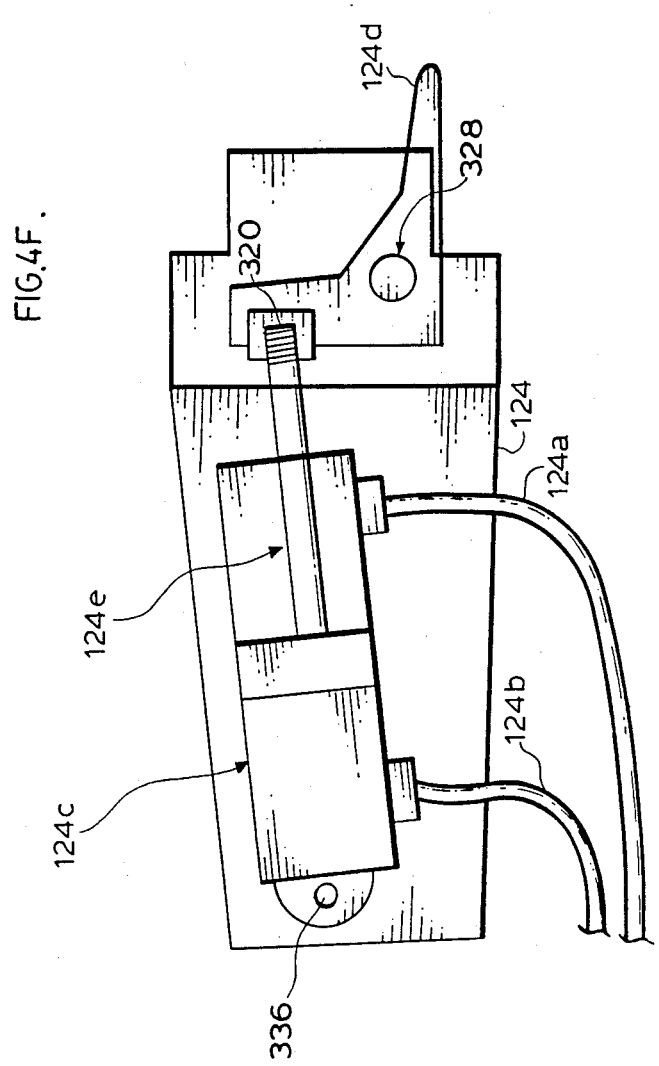

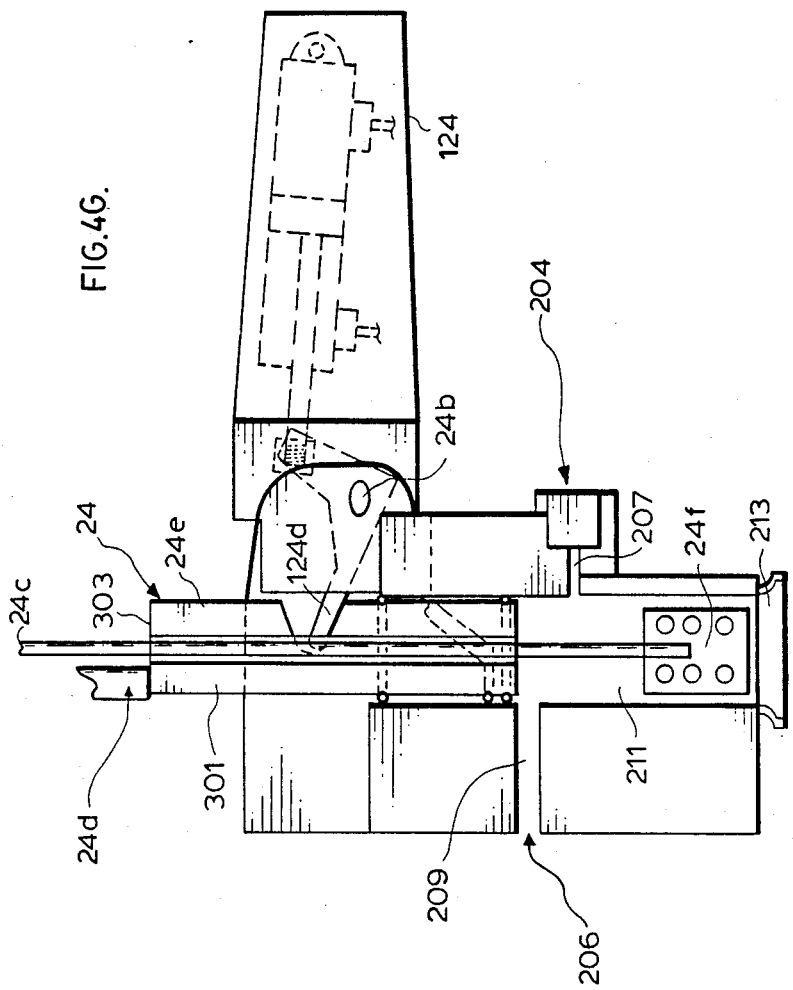

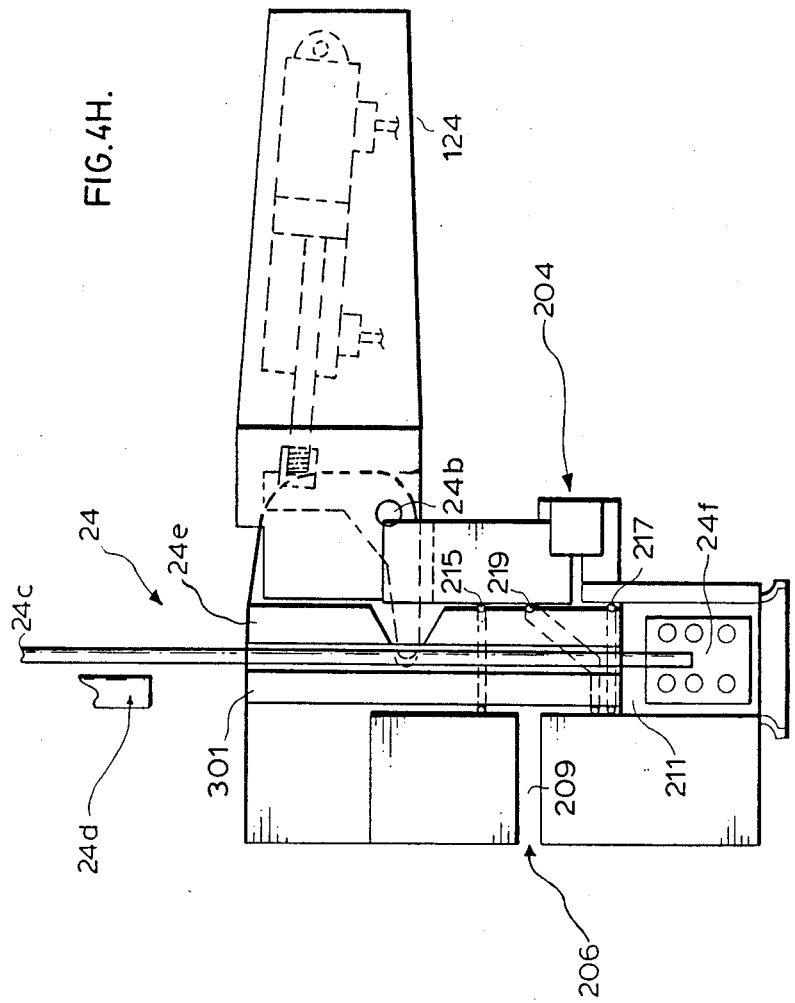

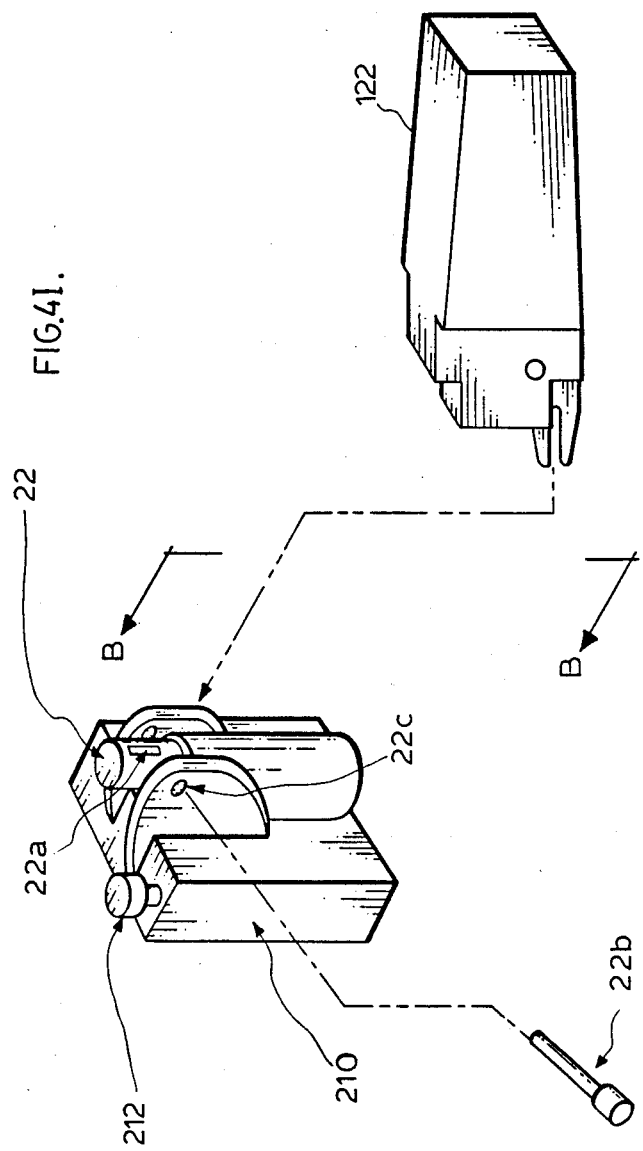

FIG.4O.
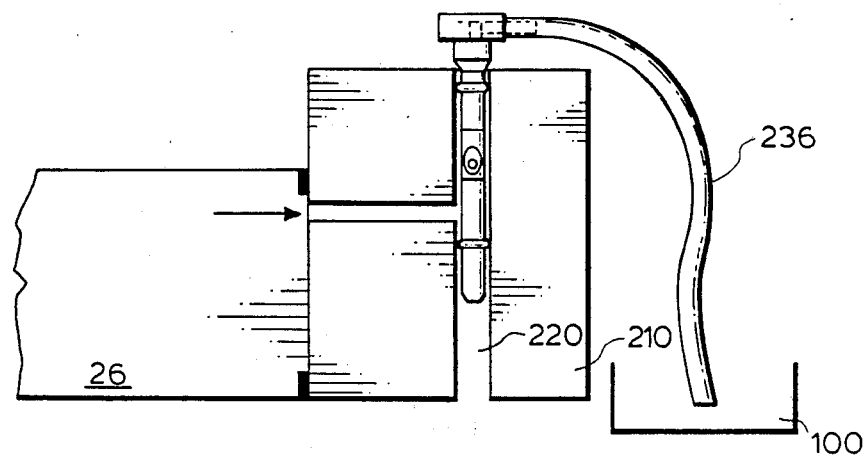
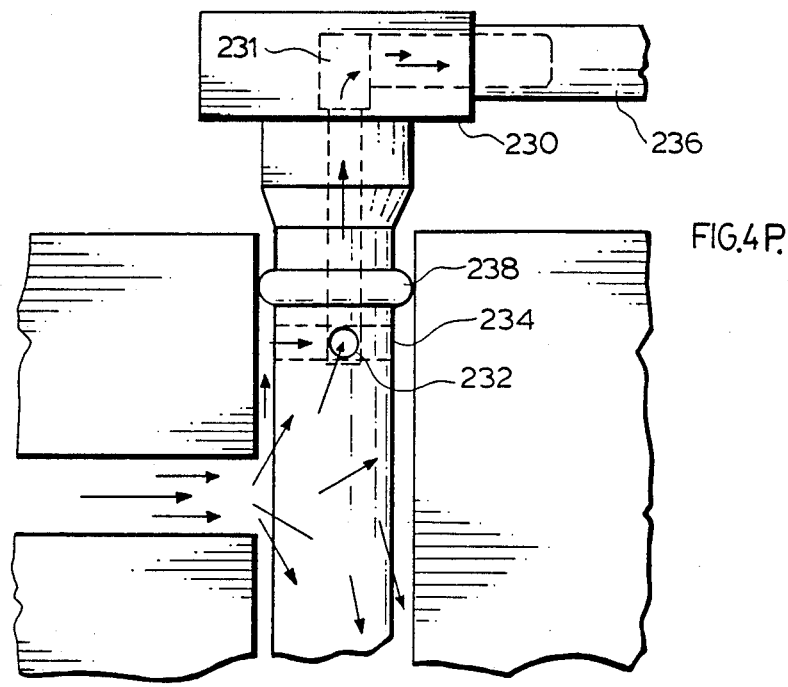
FIG.4P.

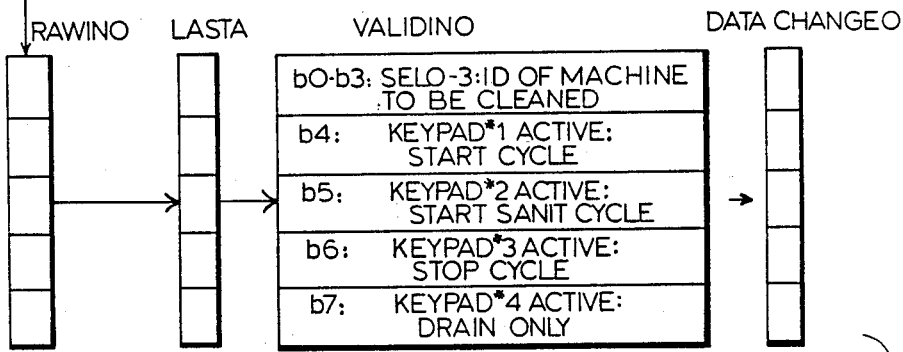
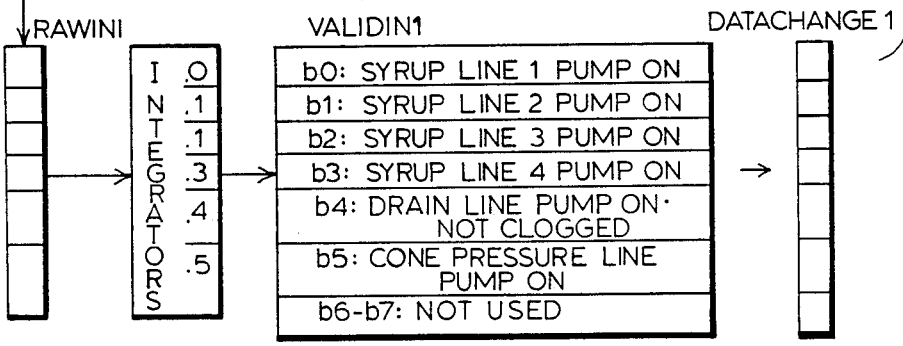
FIG.9.

FIG.10.

FLAG REG

| CYCLEON: | CYCLE IN PROGRESS |
|---|---|
| ASSIGNED: | LEVERS ASSIGNED |
| DRAIN: | DRAIN ONLY CYCLE RUNNING |
| SANIT: | SANIT. ONLY CYCLE RUNNING |
| BEEP: | SINGLE 1 SEC. BEEP |
| INTRG.1: | INTEROGATE MODES: CYCLE LOG |
| INTRG.2: | INTEROGATE MODES: LOGGED ERRORS |
| PROG.: | PROG. MODE: SET CLOCK |

FIG.13.

| LEVER REG.1 |
|---|
| LEVER REG.2 |
| LEVER REG.3 |
| LEVER REG.4 |

DATA OUT 0

| b0: | SHAKE LEVER 1 ON (DOWN) |
|---|---|
| b1: | SHAKE LEVER 2 ON (DOWN) |
| b2: | SHAKE LEVER 3 ON (DOWN) |
| b3: | SHAKE LEVER 4 ON (DOWN) |
| b4: | CONE LEVER ON (DOWN) |
| b5: | WATER VALVE ON |
| b6: | DET. PUMP ON |
| b7: | SANIT. PUMP ON |

DATA OUT 1

| b0 | SHAKE LEVER 1 OFF (UP) |
|---|---|
| b1 | SHAKE LEVER 2 OFF (UP) |
| b2 | SHAKE LEVER 3 OFF (UP) |
| b3 | SHAKE LEVER 4 OFF (UP) |
| b4 | CONE LEVER OFF (UP) |
| b5 | RELAY K1 ON |
| b6 | RELAY K2 ON |
| b7 | RELAY K3 ON |

FIG.11.

CLEAN IN PLACE SYSTEM

This is a continuation in part of application Ser. No. 014,552, filed Feb. 13, 1987, entitled Clean In Place System.

The present invention relates generally to systems for cleaning food processing equipment, and particularly to a system and method for cleaning ice cream cone and shake makers in place—i.e., without moving the cone and shake maker from the location where it is normally used.

BACKGROUND OF THE INVENTION

Ice cream cone and milk shake makers are standard equipment not only in ice cream parlors but also in convenience restaurants. There are a large number of different models made by a number of different manufacturers, including machines that make only cones, machines that make only milk shakes, and machines that make both. Nevertheless, most of these machines have basically similar plumbing and therefore similar cleaning needs.

Cone and shake makers, like most food processing machines, need to be cleaned thoroughly every day to prevent the growth of bacteria. The problem addressed by this invention is how to efficiently clean cone and shake makers.

Until now, cone and shake makers have been cleaned manually. Proper manual cleaning requires extensive disassembly of the cone and shake maker so that each component which is exposed to food products can be thoroughly cleaned. In a typical cone and shake maker with four syrup flavors, there are dozens of components which need to be cleaned. Proper cleaning of such a machine will typically take 1.5 man hours each day.

Disassembly for cleaning creates at least two major problems: breakage caused by mishandling the equipment, and unsanitary conditions caused by failure to meticulously clean every component. In fact, a common problem is the failure of restaurant personnel to clean the cone and shake maker every day, because the cleaning procedure is so tedious and takes so long.

The present invention is a system and method for cleaning, in place, fluid product dispensers such as cone and shake makers. The primary purpose of the invention is to provide an effective, but easier way to clean these machines. The preferred embodiment of the present invention allows a typical cone and shake maker to be cleaned using less than one third of the manpower previously used. Once the clean in place system is attached to cone and shake maker, the cleaning cycle requires no human intervention—leaving the user free to perform other tasks. Typically, the cleaning cycle takes 20 to 30 minutes—thereby reducing not only the manpower used, but also reducing the total time occupied by the cleaning process by approximately half.

Since most cone and shake makers are cleaned at the end of the business day, providing a short cleaning cycle is important so as not to unnecessarily delay restaurant closings. Currently, the cleaning of the cone and shake maker is often the last task to be completed by the cleanup crew.

The closest prior art systems known to the inventors are the clean in place systems used in dairy processing plants. In particular, both the dairy plant cleaning systems and the present invention perform their cleaning tasks by running water and water mixed with cleaning chemicals through the food processing channels.

However, cone and shake machines have a number of physical characteristics which make their cleaning requirements different than those of dairy processing plants. For instance, physical space restrictions are much less important in a dairy processing plant than in a restaurant. Therefore dairy plant systems can use large baths for mixing detergents and sanitizing chemicals with water, whereas this is not practical in a restaurant. Also, the clean in place systems for dairy plants are built into, or integrated with, the processing equipment. While the present invention can also be integrated into a cone and shake maker, there are tens of thousands of cone and shake makers being used which were not designed to include a clean in place system within the machine's housing. Therefore it has been one of the primary goals of the inventors to provide a practical clean in place system which can be housed in a moveable cart of reasonable size, e.g., no more than 3′ by 2′ by 3′ tall. The inventors anticipate that most models of the invention, or at least most of those made during the next few years, will be housed in separate moveable carts which are connected to the cone and shake mixer only for cleaning.

Another difference between dairy plants and cone and shake machines is that cone and shake machines typically have several draw valves which are fed from the same freezer—requiring a series of steps for cleaning the draw valves one at a time. As a result of these factors the inventors determined that they needed to provide apparatus for automatically opening and closing draw valves in accordance with a specified sequence. Also, the cone and shake freezers and the draw valves were designed to be cleaned while disassembled—they were not designed to facilitate cleaning by a clean in place system. To solve this problem, the apparatus according to one aspect of the invention provides the agitation necessary for effective cleaning by activating, under program control, the mixing apparatus in the freezers and also for activating the spinners in the draw valves.

SUMMARY OF THE INVENTION

In accordance with an aspect of the invention, a cleaning system for a fluid product dispenser, which has means for supplying fluid product to a dispensing valve, comprises:

(i) a mixing tank for containing treatment solutions;

(ii) means for delivering treatment solutions from the mixing tank to the fluid product supply means;

(iii) means for actuating the dispensing valve to open and close the dispensing valve where the actuating means is responsive to valve open/close signals;

(iv) means for controlling the cleaning system, the control means generating valve open/close signals to open and close the dispensing valve a multiplicity of times in accordance with a predefined sequence to release intermittently the treatment solutions from the fluid product supply means through the dispensing valve.

In accordance with another aspect of the invention, a method of cleaning a fluid product dispenser which has means for supplying fluid product to a dispensing valve comprises:

(i) removing fluid product from the fluid product supply means;

(ii) providing in a tank required rinse solutions/treatment solutions;

(iii) delivering the rinse solutions/treatment solutions from the tank to the fluid product supply means;

(iv) pressurizing the solutions in the fluid product supply means;

(v) opening and closing the dispensing valve periodically to pass the solutions through the fluid product supply means and the dispensing valve the method being characterized in connecting means for actuating the dispensing valve to open and close the valve, controlling the actuating means by a controller comprising a preprogrammed computer, programming the computer with a program to generate signals for actuating the actuation means to open and close the dispensing valve in accordance with a schedule predetermined by the program.

BRIEF DESCRIPTION OF THE DRAWINGS

Additional features of the invention will be more readily apparent from the following detailed description and appended claims when taken in conjunction with the drawings, in which:

FIGS. 5 and 5A schematically depict the control circuitry of the preferred embodiment.

FIG. 9 depicts the input data structures for receiving logical inputs from the cone/shake maker and the clean in place system.

FIG. 10 depicts the FLAGREG data structure for denoting the current status of the clean in place system.

FIG. 11 depicts the data output data structures.

FIG. 13 depicts the LEVERREG data structure for denoting which syrup line pump corresponds to each shake draw valve actuator used in the preferred embodiment.

DETAILED DESCRIPTION OF THE PREFERRED EMBODIMENTS

Figure 1:
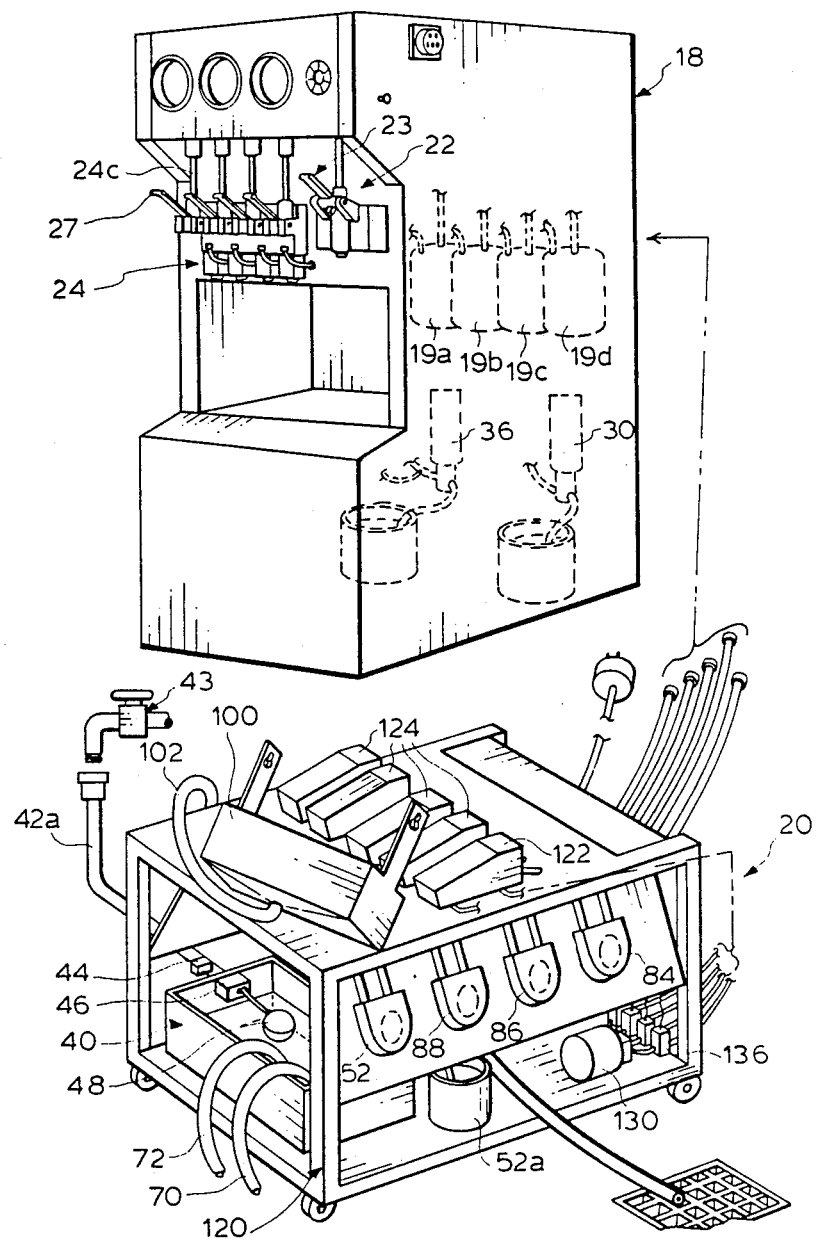
FIG. 1 is a perspective view of a cone/shake maker to be cleaned by the clean in place system also shown in perspective.

An important feature of the preferred embodiments of the invention is a system for mixing inflowing water with detergent and sanitizer (during different phases of the cleaning cycle) "on the fly". In most restaurants there is generally insufficient room to have a bath for mixing all the detergent water needed to perform a thorough cleaning. Also, the need to provide as short a cleaning cycle as possible—so as not to unnecessarily delay restaurant closings—makes it undesirable to use a significant amount of time mixing chemicals.

Another feature of the present invention is the ability to detect problems, such as clogged pathways, which may compromise the effectiveness of the cleaning process. For instance, the preferred embodiment can detect the following problems: clogged and leaking syrup lines, insufficient supplies of detergent and sanitizer, low water temperature, insufficient water flow from the water supply, and a clogged drain line. Upon detecting any of these problems, the system can generate an audible alarm and display a message to explain the nature of the problem.

Along the same lines, the present invention may include a recording system for making a record of each cleaning cycle and the problems, if any, encountered during each cycle. These records permit management to check that the required cleanings have been performed and, by reviewing the reported problems, to assess the need for repairs or changes in the cleaning procedure.

The cleaning system in the preferred embodiment has a mixing tank for mixing water with a cleansing chemical, the mixing tank having a capacity of less than two gallons, which is less than one fourth of the volume of the cleansing chemical solution to be used while cleaning a cone/shake maker. The system controllably provides the cleansing chemical to the mixing tank at a rate corresponding to the rate at which water flows into the mixing tank, thereby making a cleansing chemical solution of predefined concentration on the fly as the solution is being used to clean the cone/shake maker. The system monitors the conductivity of the water solution and generates an error message if the conductivity falls outside a specified range for at least a threshold period of time, thereby providing the user with a warning that the system is having a chemical dispensing problem.

The cleaning system includes a draw valve actuator for each of cone/shake maker's draw valves and a controller for opening and closing these draw valves in accordance with a specified schedule. To effectively and efficiently clean all of the draw valves, each draw valve is opened separately, which allows the full pressure developed by each freezer's product pump to be separately applied to each draw valve.

The cleaning system can be adapted to identify the configuration of the cone/shake maker to which it is attached. The configuration defines whether there is a cone freezer and/or shake freezer, and the number of shake dispensing draw valve coupled to the shake freezer. Each shake dispensing draw valve is coupled to a separate syrup supply line in the common shake freezer. If there is a cone freezer, it has a cone pressure line used by the cone/shake maker to determine when cone product needs to be pumped into the cone freezer.

The cleaning system may include one pump for each of its draw valve actuators. Each pump can be used for pumping fluid from the mixing tank into either a syrup supply line or a cone pressure line. Each pump has a tube (also called a cleaning line) with a connector for coupling the pump to a syrup supply or cone pressure line, and these connectors are designed to prevent fluid from being pumped therethrough if the pump is not attached to a syrup or cone line. Also, each pump includes a pressure switch for generating a pressure signal indicating whether the pressure on the corresponding syrup or cone line exceeds a predefined pressure limit. Each pump is activated only when its pressure switch generates a low pressure signal. Therefore, unless the line has a leak, the corresponding pump will be turned on only when the corresponding draw valve is opened allowing fluid to flow through the line.

In the preferred embodiment of the invention, there is a distinctly marked draw valve actuator and cleaning line for use with the cone maker portion of the cone/shake maker. The cone cleaning line has a different connector than the shake cleaning lines and therefore can only be connected to the cone pressure line. The cone draw valve actuator is mechanically similar to the shake draw valve actuators, but is marked so that the cleaning system will know which actuator is connected to the cone draw valve.

Since the cleaning system is designed to work with more than one configuration, it may have more shake draw valve actuators than the number of shake draw valves on at least one cone/shake maker configuration that can be cleaned by the system. Also, the system is set up to allow the user to attach any shake draw valve actuator to any one of the shake dispensing draw valves, and to attach any of the syrup cleaning lines to any of the syrup lines. Therefore the system's controller is programmed to determine which draw valve actuator corresponds to each of the system's shake cleaning lines. This is done by separately activating each actuator and then monitoring the pressure switch signals to find the corresponding syrup cleaning line. As a result, the system assigns one actuator and one cleaning line to each draw valve associated with the configuration of the cone/shake maker.

After the system has determined which cleaning and syrup line is coupled to each of the actuators, the system's controller can be programmed to generate an error message on the system's display if a leaky syrup line is found (i.e., if any of the pressure signals indicate that the corresponding line pressure is below the limit for at least a threshold period of time while the corresponding draw valve is closed) or if a clogged syrup or cone line is found (i.e., if any of the pressure signals indicate that the corresponding line pressure is above the limit for at least a threshold period of time while the corresponding draw valve is open).

Another feature of the preferred embodiment is a nonvolatile memory for storing a record of each time the system is used to clean a cone/shake dispenser, including an indication of the current time and date and of the error conditions detected during the cleaning cycle. These records can be used to determine when the system has been used and what error conditions occurred.

Referring to FIGS. 1, 1A, 1B, 1C and 1D, there is shown a cone/shake maker 18 and the preferred embodiment of a clean in place system 20 for the cone/shake maker. Although the system 20 is discussed with respect to cleaning the device 18, it is appreciated that the system 20 is useful in cleaning any type of fluid product dispensing device.

For convenience, the abbreviation CSD will be used for cone/shake dispenser or maker, and the abbreviation CIPS will be used for clean in place system.

Overview of Relevant Cone/Shake Dispenser Features

The CIPS 20 can be used to clean several different CSD models. A typical CSD, such as the one shown in FIG. 1, has both an ice cream cone dispenser 22 and several shake dispensers 24 for making milk shakes with different syrup flavors. Different CSD models can have different configurations of cone and shake dispensers 22 and 24. The preferred embodiment of the CIPS 20 can clean any CSD having zero to one cone dispensers 22 and zero to four shake dispensers 24. In other words, the CSD configurations may vary from small machines with just a cone maker, or just a shake maker with flavors, to larger machines, such as shown in FIG. 1, with both a cone maker and a shake maker with up to four syrup flavors, as provided in containers 19a, 19b, 19c and 19d.

The syrup flavors, as provided in the containers 19a through 19d, are under pressure. Air pressure is provided by compressor 17 which provides pressurized air in the manifold 21. The syrup lines carry the respective syrup flavors in the lines 90a through 90d which extend down to the bottom of each of the syrup containers 19a through 19d. When a draw valve 24 is opened, syrup from the respective line 90a through 90d is combined with the shake mix emerging from the freezer 28 to provide the flavored shake as it emerges from the dispenser draw valve. The respective stirrer 24c is actuated to ensure a homogeneous mixture of the syrup with the shake mix provided in the freezer 28. The stirrer's operation will be discussed in more detail with respect to FIG. 4G.

In a typical, large CSD 18 there is a cone freezer barrel (hereinafter called the cone freezer) 26 and a shake freezer barrel (hereinafter called the shake freezer) 28. The CSD has a product pump 30 for adding cone product to the cone freezer 26 when the pressure on a cone pressure line 32 is below a predefined threshold. The cone pressure line 32 is typically a tube that couples the cone freezer 26 to a pressure switch in the CSD's control circuitry 34. During normal use (as opposed to when the CIPS is connected to the CSD for cleaning) the cone product pump's inlet 74 is coupled to a supply 75 of cone product 31.

In most CSDs there is only one draw valve 22 (also called a cone dispenser) for each cone freezer 26, although some models have three or more. The draw valve 22 is typically operated by a hand lever 23 that opens a passage way through the draw valve when the lever is pushed down, and closes the valve when the lever is pushed up.

The shake freezer 28 also has a product pump 36 that adds a supply 77 of shake product 79 to the shake freezer 28. During normal operation (i.e., except when the CSD is being cleaned), the shake product pump 36 is activated when any of the shake draw valves 24 are opened by operating the respective hand lever. As will be discussed in more detail below with reference to FIG. 4D each shake draw valve is coupled to a mechanical switch 24d which, during normal operation, activates the shake product pump 36 when the draw valve is opened.

The draw valves 24 for dispensing shakes include a motor 25 for driving spinner 24c for mixing the milk shake with flavored syrup. During normal operation, these spinners are individually turned on by the mechanical switch 24d (FIG. 4D) in the corresponding draw valve. As will be described below, during cleaning these spinners can be turned on and off by the CIPS. In general, turning on the spinners increases agitation in the draw valves and therefore promotes cleaning.

In the preferred embodiment, the controller 34 for a standard CSD has been modified so that three control signals K1-K3, as provided in cable 33 from the controller of the CIPS, can be used as on/off control signals for the spinners (K1), the shake freezer's pump and mixer (K2), and the cone freezer's pump and mixer (K3), respectively. A set of four jumpers has also been added to the controller 34 to generate a four-bit binary signal SEL3-0 that identifies the model or configuration of the CSD (i.e., the number and types of draw values in the CSD).

Overview of Clean In Place System Components

The CIPS 20 has a mixing tank 40 for providing both rinse water and water mixed with either detergent or sanitizer for use in cleaning the CSD 18. The mixing tank 40 has a usable capacity of approximately one gallon even though twenty to thirty gallons of water are used in a typical cleaning cycle. The reason the mixing tank 40 is so small is to make the CIPS 20 small enough to fit on a small four wheeled cart 120. Generally, the mixing tank will have a capacity of less than two gallons and less than one fourth of the total water used, and will preferably have a usable capacity of approximately one gallon or less, or less than one tenth of the total water used.

As will be described in detail below, the present invention provides a system for mixing water with cleansing chemicals (i.e., detergent and sanitizer) as water is added to the mixing tank 40 so that the concentration of cleansing chemical in the mixing tank remains within a specified range.

Water is added to the mixing tank 40 as follows. Water flows from a water supply (such as a water tap 43) to the tank 40 through a sequence of elements: a solenoid valve 42, a flow meter 44, and then a float valve 46 which closes off when the valve's float 48 rises to a level that indicates that the tank 40 is full.

The CIP's controller 50 generates a binary control signal WaterSw which opens and closes the solenoid valve 42. As water flows into the tank 40, the flow meter 44 generates one pulse for each predefined volume or unit of water which flows through the meter 44. The controller counts the flow pulses and thereby calculates the amount of water which has been added to the tank 40. In the preferred embodiment, the flow meter consists of a paddle wheel in a cavity through which the water passes. As the paddle wheel turns, it breaks a light beam from a lamp to a detector, producing 1160 pulses per liter. The controller 50 of the CIPS communicates with the controller 34 of the CSD. As noted in FIG. 1A, cable 33 extends from the controller 34 to an electrical female connector 33a. A cable 33b extends from the controller 50 and has male electrical contact 33c which is plugged into the female electrical contact 33a. Various signals are then communicated through the cable 33 and 33b.

As already noted, the three control signals, as generated by the CIPS controller 50 and itemized as K1, K2 and K3, are transmitted to the dispenser's controller 34. The signal SEL3-0 generated by the controller 34 to identify the model is also communicated to the CIPS controller 50. The controller 34, in accordance with signal commands provided in cable 33, controls the operation of various CSD components.

Figure 1A:
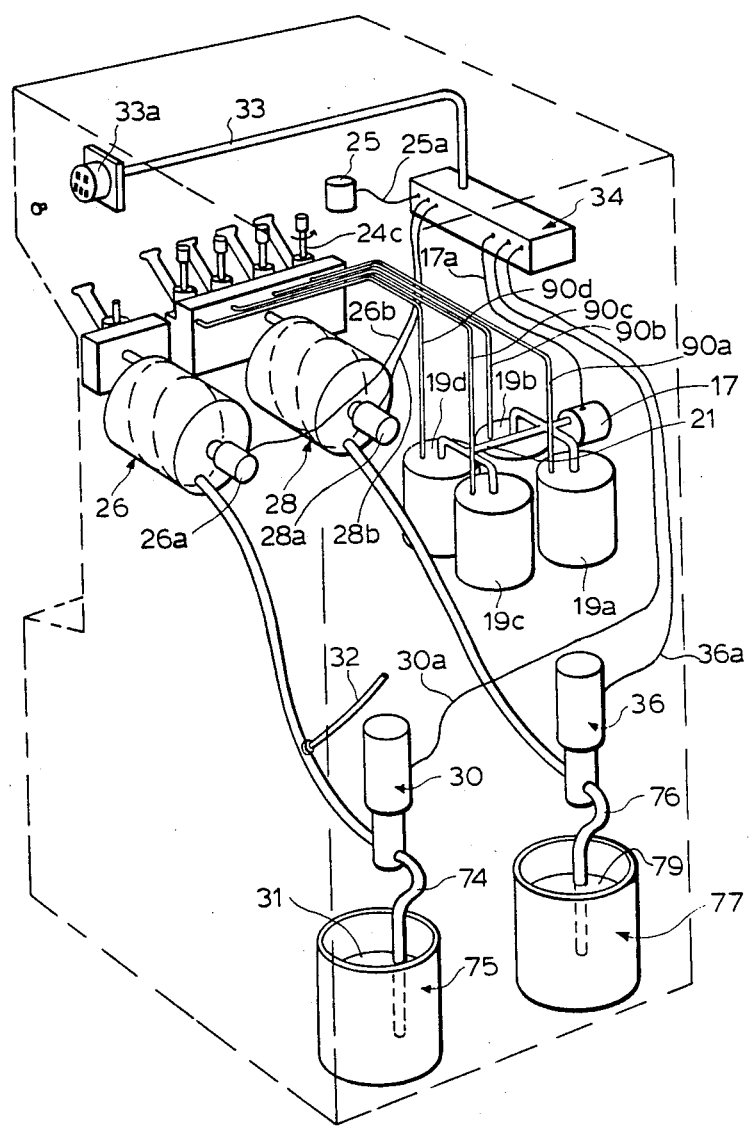
FIG. 1A is a rear perspective view of the cone/shake maker of FIG. 1.

As shown in FIG. 1A, the controller 34 actuates and controls the operation of the pumps 30 and 36 by way of electrical leads 30a and 36a. Similarly the operation of the air compressor 17 is controlled by signals transmitted in the electrical lead 17a. The motor drives for the freezers 26 and 28 are identified as 26a and 28a. The controller 34 controls the operation of the freezer motor 26a through the electrical lead 26b. Similarly controller 34 controls the operation of the motor 28a through the electrical lead 28b. The operation of the stirrer motor 25 is controlled through the electrical lead 25a.

Two pumps 52 and 54 pump detergent and sanitizer from corresponding supply bottles 52a and 54a into the mixing tank 40. To reduce the risk of users providing these pumps with the wrong chemicals, incompatible connectors 52b and 54b, as shown in FIG. 1C, are used to connect the detergent and sanitizer pumps to their supply bottles. In an alternate embodiment, different size bottle "seats" are provided below the detergent and sanitizer pumps, corresponding to detergent and sanitizer bottles of different sizes, to discourage inadvertent connection of the pumps 52-54 to the wrong chemical supply.

As will be described in more detail below, during detergent and sanitizer cycles, as cleansing solution is drawn from the mixing tank 40 for cleaning the CSD 18, water automatically flows into the tank 40 to replace the withdrawn solution and a specific amount of the corresponding chemical is added to the mixing tank 40 for each unit of water which flows through the meter 44 into the tank 40. Thus the cleansing chemical solution is mixed "on the fly" as the cleansing solution is being used.

The conductivity of the fluid in the mixing tank is monitored by the controller 50 to ensure that (1) the correct chemical supply is connected to each pump 52-54, (2) that the chemical supply has not been exhausted, and (3) that the quantity of chemical added falls within a specified concentration range. For this purpose the controller 50 is coupled to a probe connector 60, near the bottom of the tank 40, which includes a temperature probe 62 and a conductivity probe 64.

The basic operation of the conductivity probe 64 is as follows. The controller 50 periodically samples the conductivity of the medium between the conductivity probe's two elements. The resulting measurement is compared with a specified conductivity range to determine if the fluid in the tank 40 is within the specified concentration range. In the preferred embodiment, an allowed conductivity range is specified for every "step" of the cleaning process. If the measured conductivity remains outside the specified range for at least a threshold period of time, an error message is generated. A more detailed description of how these probes are used is provided below in the sections describing the corresponding portions of the control software.

The contents of the mixing tank 40 are pumped into various portions of the CSD 18 by several different pumps. The product pumps 30 and 36 inside the CSD 18 are connected to the mixing tank 40 by tubes 70 and 72, which have end connectors 71 and 73 that mate with the product inlet lines 74 and 76. Five pumps 80-88 inside the CIPS 20 pump fluid from the mixing tank 40 into the syrup lines 90, 90b, 90c and 90d and the cone pressure line 32.

Tubes 70 and 72 extend close to the bottom of the mixing tank 40 so that water will be drawn into the mix pumps 30 and 36 unless the mix tank is empty. Tube 75 which feeds pumps 80-88 through a bundle of tubes 75a, on the other hand, extends only about halfway from the high water level to the bottom of the tank 40 so that air can be drawn through the syrup lines 90 to clear these lines at various points in the cleaning cycle, such as at the end of the initial rinse cycle.

The cone pressure line 32 has a different connector 32a than the syrup line connectors 35a, 35b, 35c and 35d, thereby ensuring that the proper pump (pump 80) is connected to the cone pressure line 32. In most cases, the product lines 74 and 76 do not have end connectors instead these lines are typically fairly large (⅝ inch inner diameter) p.u.c. tubes, and therefore the CIPS tubes 70 and 72 terminate with stainless steel ferrules which fit inside the ends of the product line tubes 74 and 76.

All of the pumps 80-88, 30 and 36 are turned on and off under the control of the controller 50. Also, there is a pressure switch 92 on the outlet of each pump 80-88 which is normally closed, but which opens when the pressure on the outlet exceeds fifteen pounds per square inch (psi). In other words, each switch generates a high/low signal indicating whether the pressure on the pump's outlet exceeds, or does not exceed fifteen psi.

Figure 1B:
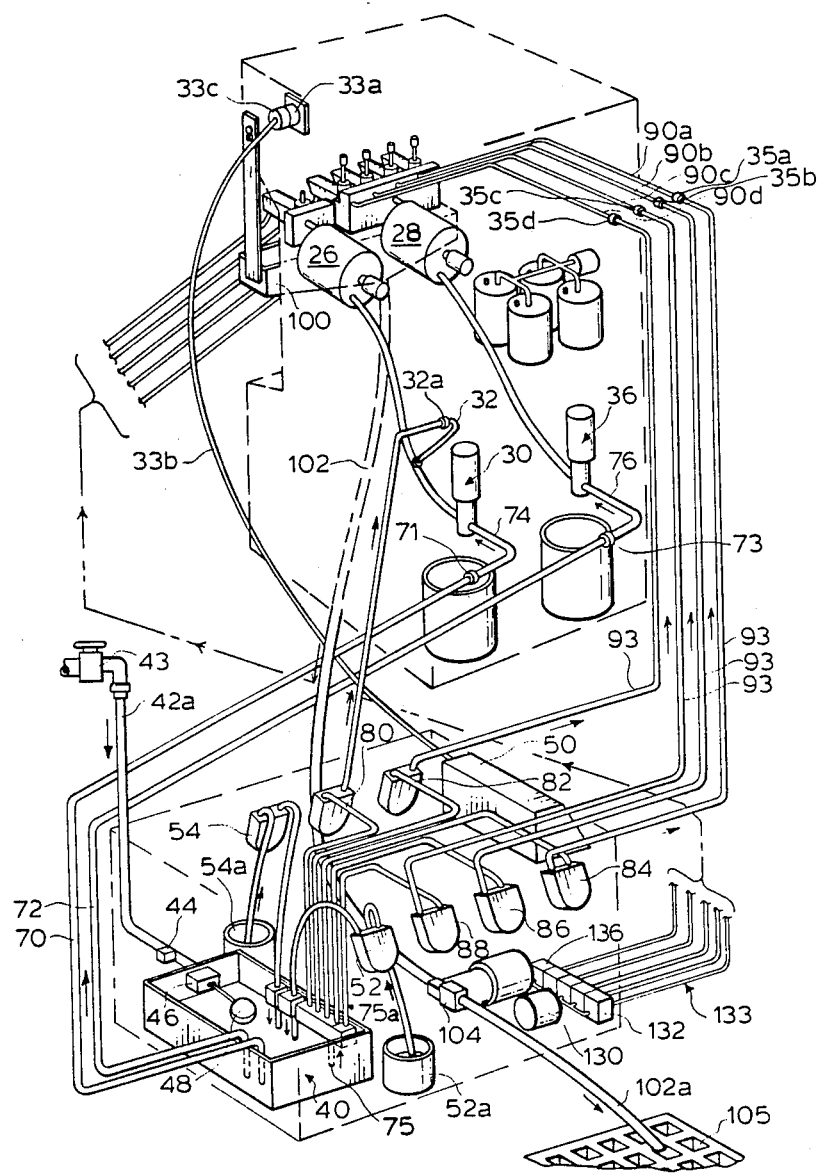
FIG. 1B is a perspective view of the cone/shake maker of FIG. 1A having the clean in place system coupled thereto for purposes of cleaning the cone/shake maker.
Figure 1C:
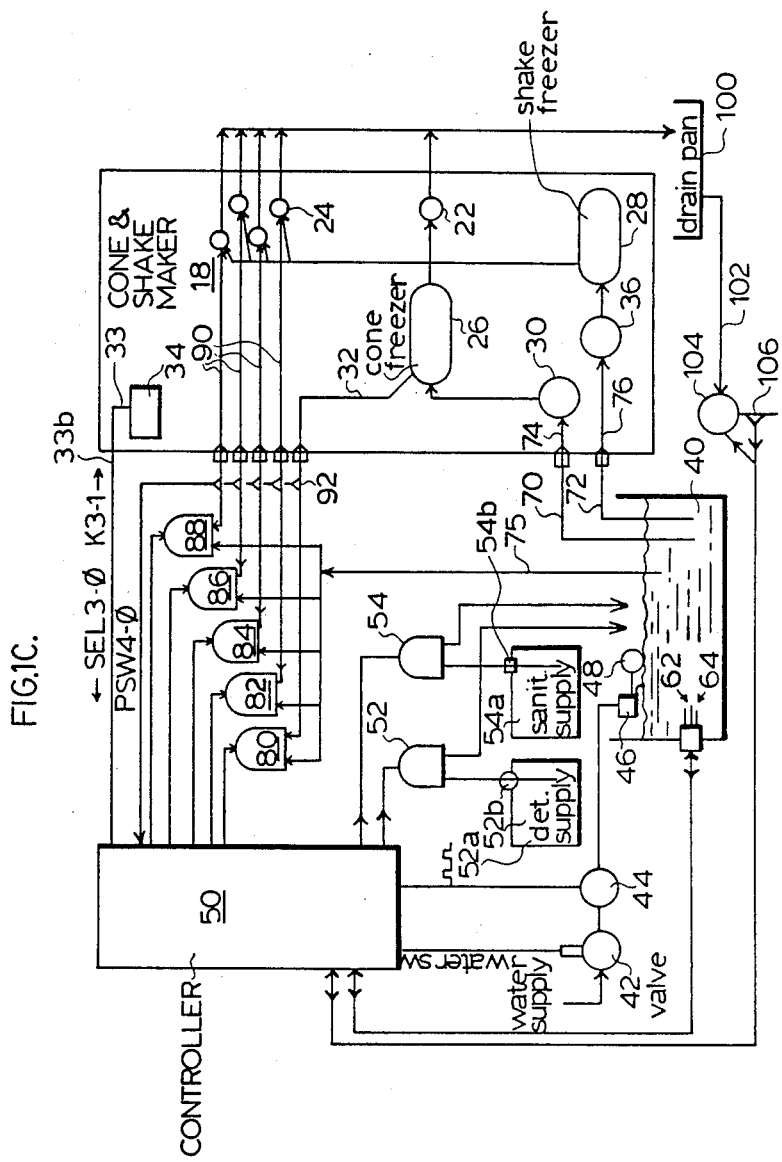
FIG. 1C is a block diagram of the cone/shake maker and clean in place system of FIG. 1 showing the interrelationship of the machine components and the electronic controller.
Figure 1D:
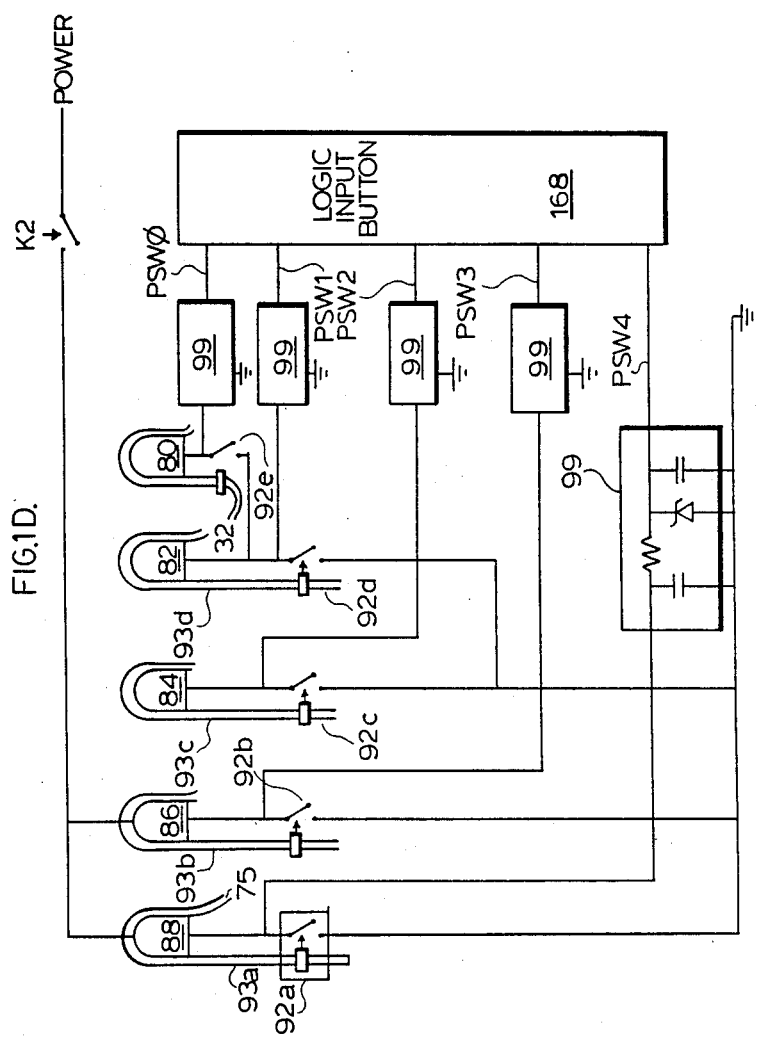
FIG. 1D is a schematic block diagram of the pumps for supplying cleaning solutions to the syrup lines of the cone/shake maker.

Referring to FIG. 1D, during cycles when the use of these pumps is enabled, each of the syrup pumps 82-88 is turned on when its pressure switch 92a, 96b, 92c or 92d detects a low pressure condition (less than fifteen psi) on its respective outlet line 93a, 93b, 93c or 93d and is turned off when its pressure switch generates a high pressure signal. The pressure switch 92 turns the pump on and off by closing and opening the pump motor's connection to ground, which completes and breaks the motor's electrical connection.

To protect the cone pressure line 32 from being damaged by excessive pumping, the cone pressure line pump 80 is turned on only when the fourth syrup line pump 82 is turned on and the cone pressure line's switch 92e detects a low pressure condition. Since the cone pressure line 32 feeds into the cone freezer barrel 26 (which is connected to a purge valve that limits the pressure in the barrel to around five psi), the cone pressure switch 92e should never detect a high pressure condition, unless the cone pressure line 32 becomes blocked or kinked.

Logic signals PSW4-0, indicating whether each pump 80-88 is on or off, are generated by running the electrical signal from the low voltage connection of each pump through a filter network 99. The output of each filter network 99 will be 0 volts if the corresponding pump is off, and about 4.7 volts if the pump is on.

The controller 50 periodically (eight times per second) reads the logical (binary) signals PSW4-0, through interface 168 to check for leaking and clogged syrup lines, as will be explained in more detail below.

A drain pan 100 is attached to the front of the CSD 18 during cleaning cycles to catch the fluids exiting the draw valves 22 and 24. The contents of the drain pan 100 are pumped through drain line 102 by a pump 104 into a drain 105. The drain pump 104 is typically turned on by the controller 50 for the duration of the cleaning cycle. The drain pump 104 is provided because the force of gravity may be insufficient to move the fluid in the pan 100 to a drain which is fairly far away, and to ensure that the fluid in the pan 100 is disposed of quickly enough to prevent the pan 100 from overflowing.

Also, if the pressure switch 106 on the drain pump's outlet indicates that the drain line is blocked for any reason, the cleaning process is halted to prevent the drain pan 100 from overflowing. An error message is also displayed when this happens.

Figure 2:
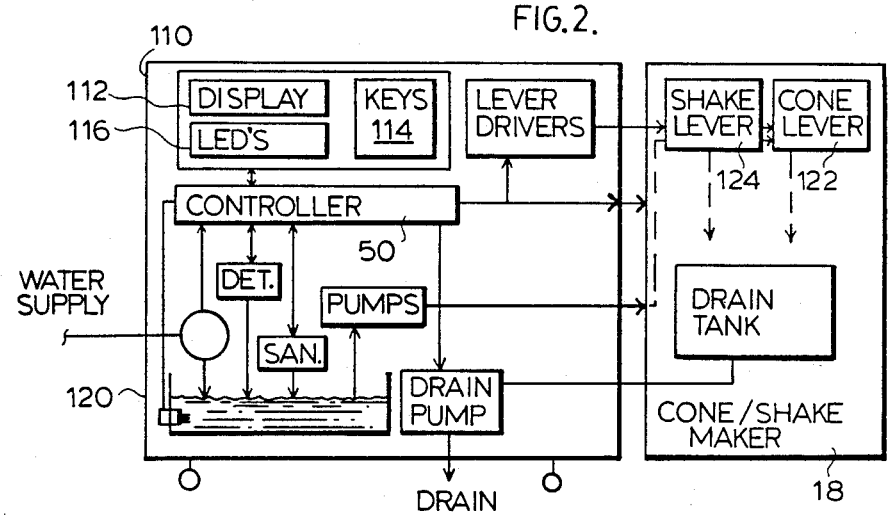
FIG. 2 is a second block diagram showing some additional components of the preferred embodiment.

FIG. 2 shows some additional components of the preferred embodiment, including a control panel 110 coupled to the controller 50. The control panel 110 has a four line on display 112 for displaying messages and recorded data, and a set of labelled keys 114 for starting cleaning processes, setting an internal clock, and reviewing stored data. The preferred embodiment also has a set of LEDs 116 for showing the current position of the CSD's draw valves 22 and 24, for reasons explained below.

Figure 3:
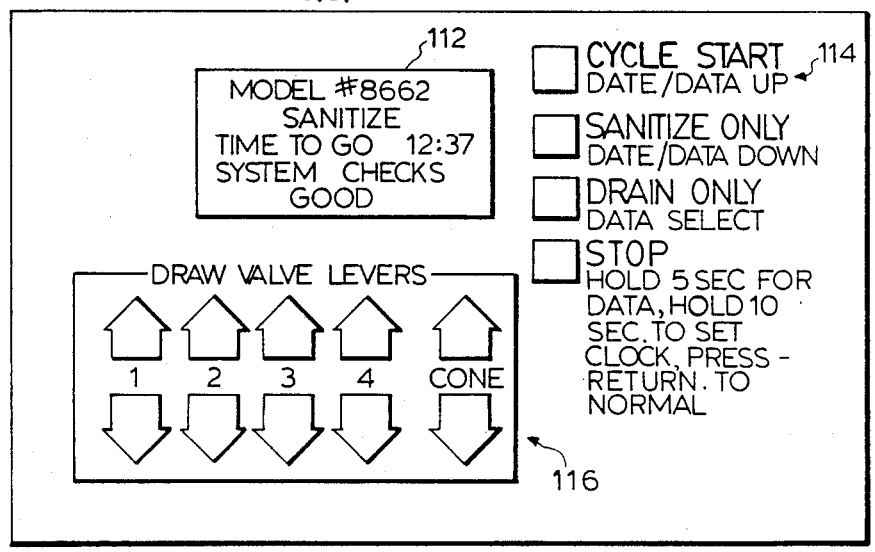
FIG. 3 depicts the display and control panel of the preferred embodiment.

The layout of the control panel 100 in the preferred embodiment of FIG. 2 is shown in FIG. 3.

Another feature shown in FIG. 2 is the moveable cart 120 in which the preferred embodiment is housed. This cart 120 has four wheels and is approximately thirty inches long, 18.2 inches wide, thirty inches high, and weighs approximately 150 pounds when loaded with all of the CIPS equipment (but not including the water in the mixing tank).

An important feature of the CIPS is the provision of draw valve levers (hereinafter called actuators or draw valve actuators) 122 and 124 for opening and closing the CSD's draw valves 22-24 in a specified sequence. One actuator is mounted on each draw valve 22-24, and the controller 50 determines when each actuator forces its draw valve UP (closing the draw valve) and DOWN (opening the draw valve).

CIPS - CSD Interconnections and Related Components

Figure 4:
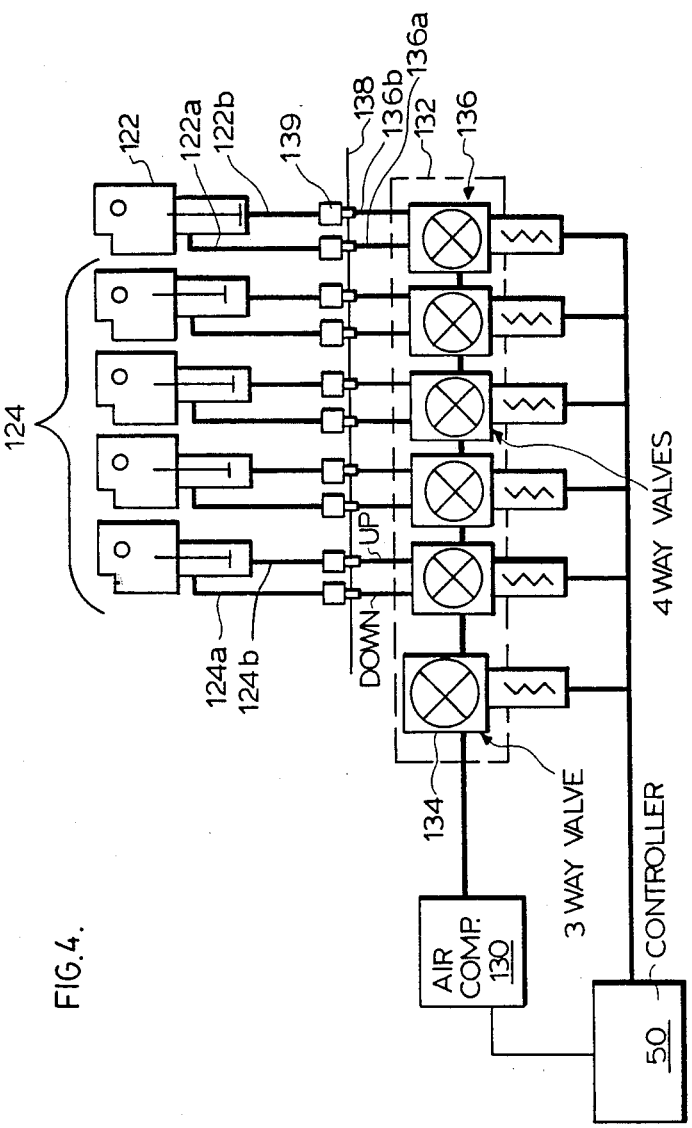
FIG. 4 schematically depicts a set of draw valve actuators.

As shown in FIG. 4, compressed air from an air compressor 130 is directed by a solenoid valve manifold 132 through hoses 122a, b and 124a, b to the draw valve actuators 122 and 124. The manifold includes a master valve 134 and five 4-way valves 136, each coupled to one actuator. Both the master valve 134 and the compressor 130 are enabled when the controller 50 generates a positive K2 control signal (which also turns on the shake pump and mixer in the CSD via a signal in line 33 to controller 34). When the K2 control signal is low, the compressor 130 is turned off, and the master valve 134 vents the pressure in the system so that the actuators go limp.

If the master valve 134 is enabled, each of the valves 136 directs the compressed air into either the UP outlet 136b or the DOWN outlet 136a so that the corresponding actuator forces its draw valve up or down. In one preferred embodiment, the actuators 122-124 are connected to the manifold 132, which is inside the roll around cart 120 (see FIG. 2) by a quick disconnect panel 138 having a plurality of releasable connectors 139 so that the actuators can be mounted on the draw valves before the actuators are coupled to the cart 120. In another preferred embodiment the actuators 122-124 are permanently coupled to the manifold 132 in the cart 120.

Figure 4A:
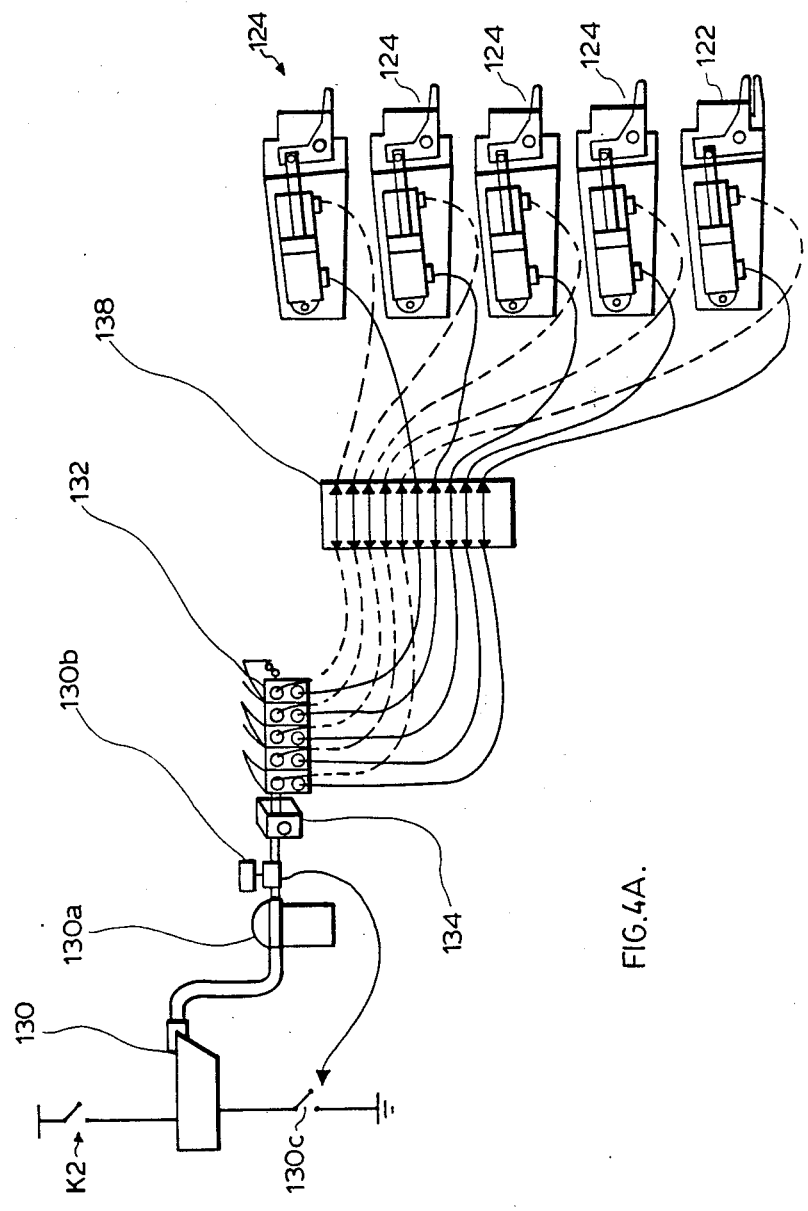
FIGS. 4A-4P further depict the draw valve actuators and other mechanical aspects of the preferred embodiment.

Referring to FIG. 4a, the air compressor 130 is followed by an air filter 130a and a pressure switch 130b. The pressure switch 130b regulates the pressure in the air module to about 15 psi by opening switch 130c (which breaks the compressor's ground connection) when the pressure in the air module is above its set point, and closing the switch 130c when the pressure falls below the set point. The compressor 130 is coupled to its power supply by a switch that is closed by control signal K2, which turns on the shake mix apparatus in the CSD 18.

Figure 4B:
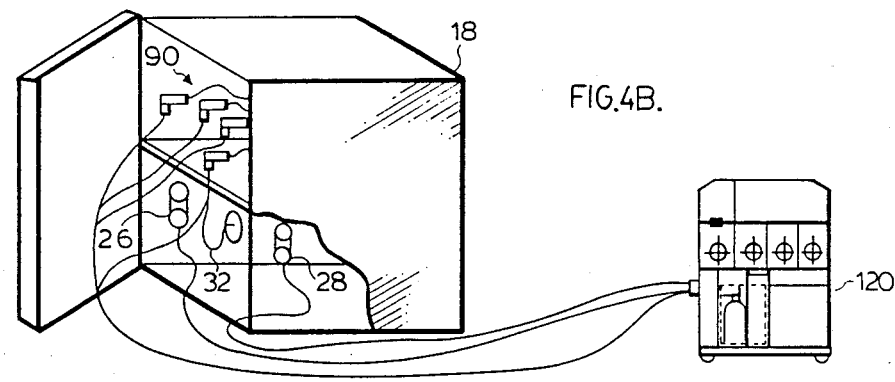

FIG. 4B depicts in a general format of what is shown in FIGS. 1, 1A and 1B the fluid line connections from the CIPS cart 120 through the rear door of the CSD to the shake lines 90, the cone pressure line 32, the cone freezer barrel 26, and the shake freezer barrel 28.

Figure 4C:
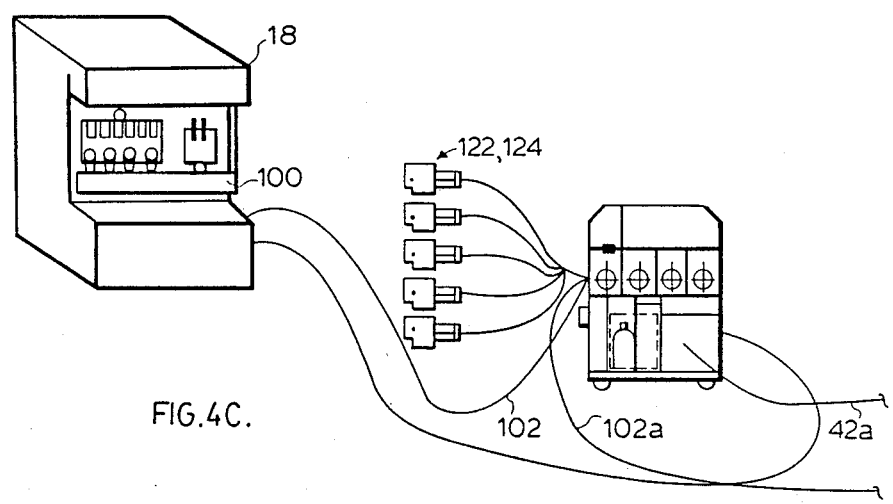
Figure 4J:
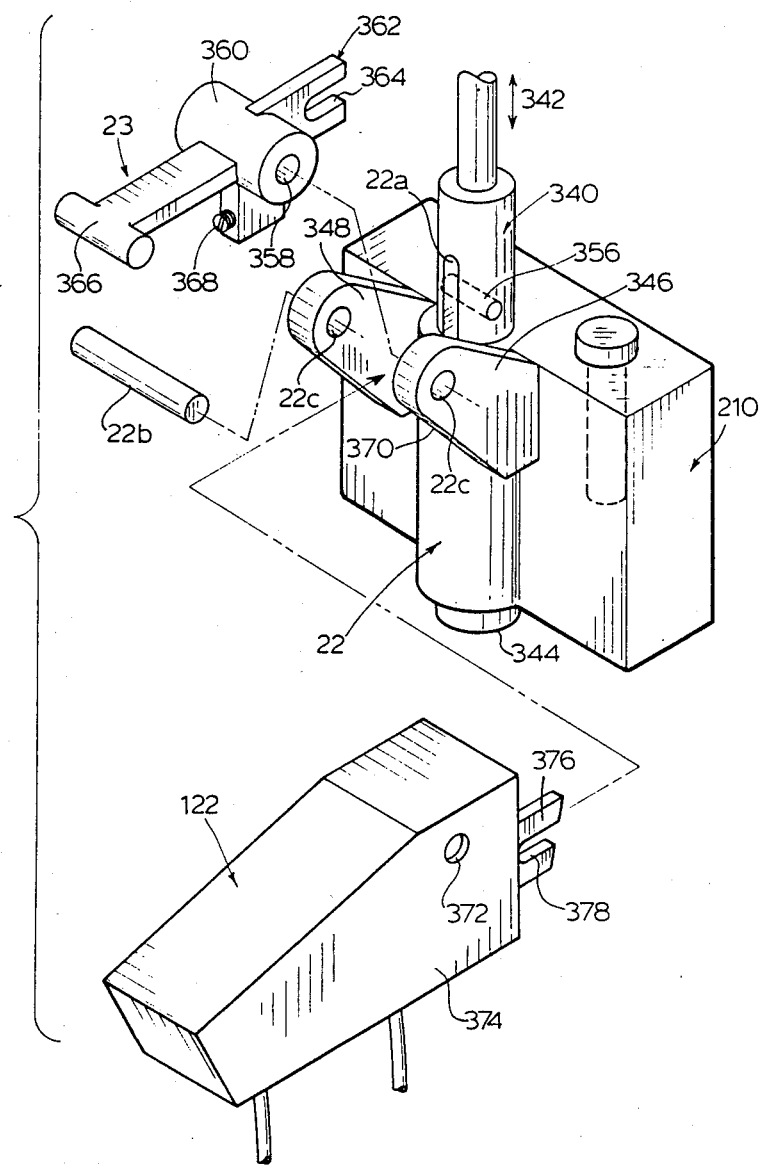

FIG. 4C depicts in a general format of what is shown in FIGS. 1, 1A and 1B the drain line 102 connection between the drain pan 100 on the front of the CSD to the drain pump in the CIPS cart 120, which pumps the contents of the drain pan through line 102a to a drain. Line 42a is the connection to the water supply used by the CIPS 20.

FIG. 4D depicts the door assembly for the milk shake dispensing portion of a CSD. The shake door 200 shown has four shake draw valves 24. Each draw valve has a mounting slot 24a in which a lever can be inserted, and mounting holes through which a mounting pin 24b can be inserted to provide a pivot for the lever. When the CIPS is being used, the normal manual lever for each draw valve 24 is replaced with an automatic actuator 124.

Each shake draw valve 24 has a spinner 24c with the shaft exposed and normally used for mixing syrup into milk shake product. Each draw valve 24 also has a microswitch 24d which is pressed when the draw valve is opened to dispense a shake. During normal operation, pressing any one of these switches will activate the shake pump and mixer. Thus during normal operation, the shake pump is on only when one of the shake draw valves is open, which prevents excess pressure from building up in the shake barrel—pressure which would otherwise damage gaskets, seals and other elements of the shake dispensing apparatus. During cleaning cycles, the CIPS system controls the operation of the shake pump and mixer with the K2 signal, overriding the normal operation of these switches 24d.

The CIPS also controls the operation of the spinners 24c in the shake draw valves, with the K1 control signal.

During most of the cleaning cycle, except when the barrels are being drained at the end of each major subcycle, the spinners are activated to increase back pressure and agitation.

FIG. 4D also shows that the shake door 200 has a purge valve 202. There is also a purge valve in the cone door, shown in FIG. 4I.

Each purge valve is connected to the corresponding freezer barrel, and is used during normal operation to remove excess air from the shake/cone freezer barrel when the CSD is recharged with shake and cone product at the beginning of the day. To be more specific, when the purge plug is pulled upwards, a passage way is opened which allows the air and liquid in the barrel to pour out through an opening in the bottom of the door 200. As will be explained below with respect to FIGS. 4N-P, an important aspect of the present invention is a vented purge plug which prevents excess back pressure from building up in the shake dispensing apparatus.

Further details of the shake door and one of the draw valves 24 is shown in FIG. 4E. The stirrer 24c extends through a cylindrical block 301 of plunger 24c which has a tapered lower face 302 to expose the stirrer rod intermediate portion 304. The hand operation of the draw valve is accomplished by moving the lever 27 which a rectangular block portion 306 with a handle 308 extending upardly therefrom. The block 306 includes a bore 310 through which a pin 24b extends to mount the rectangular block between the spaced-apart wings 312 and 314 of the shake door 200. The rectangular block 306 carries depending forks 316 which extend beneath the undercut portion 302 of the draw valve block 301 and to each side of the stirrer intermediate rod portion 304. When the handle 308 is pulled downwardly, the block 301 is raised to open the draw valve and dispense shake material from the underside of shake door 200.

The draw valve actuator 124 for mounting on the shake door 200 is also shown in FIG. 4E in an exploded view. The lever 27 is removed by withdrawing the pin 24b. The actuator 124 is then positioned between the wings 312 and 314 of the dispenser door, such that the actuator arms 124d engage the sloped face 302 of the cylindrical body 301 of the draw valve. The actuator is secured to the door by way of passing pin 24b through the aligned apertures 124f. The face 124g of each side wall 124h abuts the face 318 of the dispenser body to fix the position of the actuator 124 when the pin is located to mount the actuator on the dispenser body.

As shown in the exploded view between the plates 124h is the hydraulic cylinder 124c with piston rod 124e having distal end portion 320 with bore 322. The piston end 320 is connected to the arms 124d by way of pin 324 extending through the apertures 326 of the arms and through the bore 322. The arms 124d are mounted to the side plates 124h by way of pin 328 extending through the respective apertures 330 of the plates 124h and through the bore 332 of the block 334. Movement of the piston rod 124e in a reciprocal manner pivots the arms 124d about the pin 328 to effect an upward and downward motion. This motion is converted into raising and lowering the block 301 to either open or close the draw valve. To effect reciprocation of the piston rod 124e, compressed air is provided in the separate lines 124a and 124b. The double acting piston cylinder, when it has compressed air on one side thereof in line 124a, causes the arms 124d to raise, whereas when pressurized air is provided in line 124b, the arms lower. The rear part of the cylinder is secured in position to the plates 124h by way of securing the pin 336 to the side plates. A spacer bar 338 is also provided and secured to the spacer plates.

Automatic Actuators

FIG. 4F depicts a shake draw valve actuator 124. Two pneumatic air lines 124a and 124b connect to the pneumatic cylinder, and the air pressure in these lines pivots the actuator arm 124d (and thus the draw valve 24) up and down, respectively, by pushing cylinder rod 124e back and forth, which causes the arm 124d to pivot around the mounting pin 24d which is inserted through hole 124f.

FIG. 4G is a sectional view, corresponding to section line AA in FIG. 4D, of a shake draw valve 24 being opened by an automatic actuator 124. As shown, when the draw valve is in the open position, the draw plunger 24e is pushed up, opening the passage ways 207 and 209 from the syrup line port 204 and the shake inlet port 206. When the draw plunger 24e is pushed upwardly by upward pivoting of the arm 124d, the upper surface 303 of the cylindrical body 301 elevates a microswitch button 24d. In elevating this button, the microswitch is closed to send a signal to the CSD controller 34 which, in turn, actuates the motor 25 through lead 25a. This causes the respective spinner 24c to commence rotation to rotate the spinner blade 24f within the chamber 211 to mix the syrup entering the chamber 211 through the passageway 207, so that the product emerging from the outlet 213 is a homogeneous mix of the syrup with the ice cream.

FIG. 4H is a similar sectional view showing the shake draw valve 24 being closed by the automatic actuator 124. With the draw plunger 24e in the closed position, as shown in FIG. 4H, rubber seals close off the passageway 209 so as to be independent of the closed off passageway 207. This is accomplished by the spaced-apart o-ring seals 215 and 217, as well as a diagonally located o-ring seal 219. In this manner with the passageways closed off and independent of each other, syrup cannot be mixed with ice cream at the inlet port 206. Also, with the cylindrical portion 301 of the draw valve 24e in the lowered position, the microswitch button 24d is allowed to fall downwardly to the extent shown to remove the signal to controller 24 to actuate the respective spinner 24c. This stops rotation of the spinner within the chamber 211.

FIG. 4I depicts the door assembly for the ice cream cone dispensing portion of a CSD. The cone door 210 shown has one draw valve 22, which has a mounting slot 22a in which a lever can be inserted, and mounting holes 22c through which a mounting pin 22b can be inserted to provide a pivot for the lever. When the CIPS is being used, the normal manual lever for the draw valve 22 is replaced with an automatic actuator 122. Like the shake door 200, the cone door 210 has a purge valve 212 for expelling air and water when the cone dispenser is first filled with cone product during normal use.

Further details of the cone door is shown in FIG. 4G. The cone door 210 has a rectangular shaped body portion with a draw valve stem 340 which can be reciprocated up and down in the direction of arrow 342 to dispense ice cream product from dispensing outlet 344. Mounted on the body portion 210 of the cone door are spaced apart wings 346 and 348. Aligned apertures 22c are provided in the spaced-apart wings of the cone door. The spindle 340 includes an elongate recess 354 which provides access to a transversely extending pin 356. The lever 23 for raising and lowering the spindle to dispense product is mounted between the wings 346 and 348 by positioning mounting pin 22b through the aligned apertures and through the bore 358 which extends through the cylindrical shaped portion 360 of the lever 23. The lever is provided with a bifurcated distal end 362 to provide a recess 364. When the lever 23 is mounted in position, the pin 356 is received by the recess 364. The position of the arm 366 of the lever 23 is determined by adjustment screw 368 which contacts the face 370 of the cone door to locate the orientation of the handle 366 in space. By pushing the handle 366 downward and pivoting it about pin 22b, the spindle 340 is raised to dispense product from the dispensing opening 344.

When it is desired to clean the system, the cone draw valve actuator 122 is mounted in place of the lever 23. The pin 22b extends through the mounting holes 372 in each side 374 of the actuator. This locates the lever arm 376 in the spindle recess 354 with the pin 356 within the lever arm recess 378. A double action piston cylinder arrangement is provided within the actuator 122 of a construction similar to the shake actuator 124 shown in FIG. 4E to cause a raising and lowering of the arm 376 and hence an open and close position for the cone dispenser valve 22.

Figure 4K:
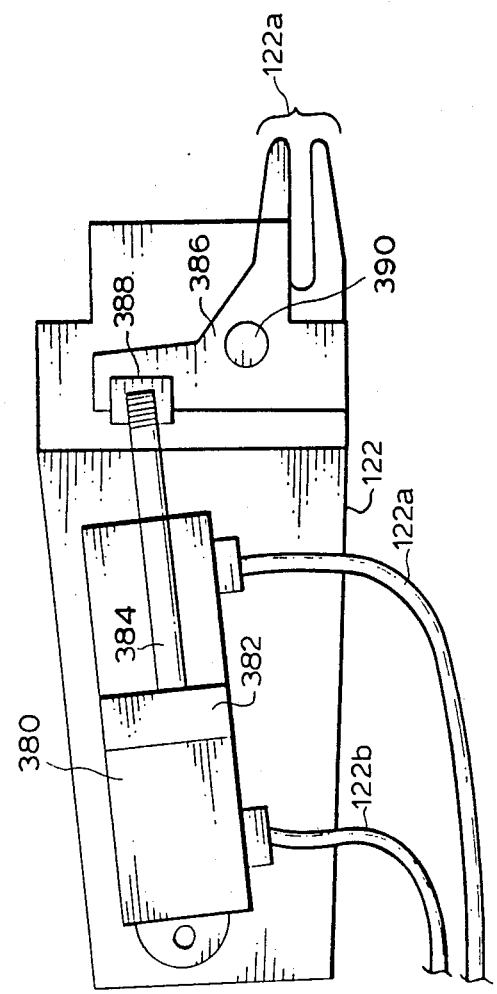

As shown in FIG. 4K, the actuating cylinder 380 has a double acting piston 382 with reciprocating piston rod 384. The end of the piston rod 384 is coupled to the actuator arm 386 at the coupling 388. The actuator arm 386 pivots about pin 390 to raise and lower the lever arm 122a. To provide for reciprocal movement in the piston 382, pneumatic air lines 122a and 122b are selectively pressurized by way of the control block 136 to either extend the rod 384 or retract the rod 384. By retracting the rod 384 in providing pressure in line 122a, the lever arm 122a is raised to open the cone dispenser. When line 122b is pressurized, the arm 122a pivots downwardly to close the cone dispenser.

Figure 4L:
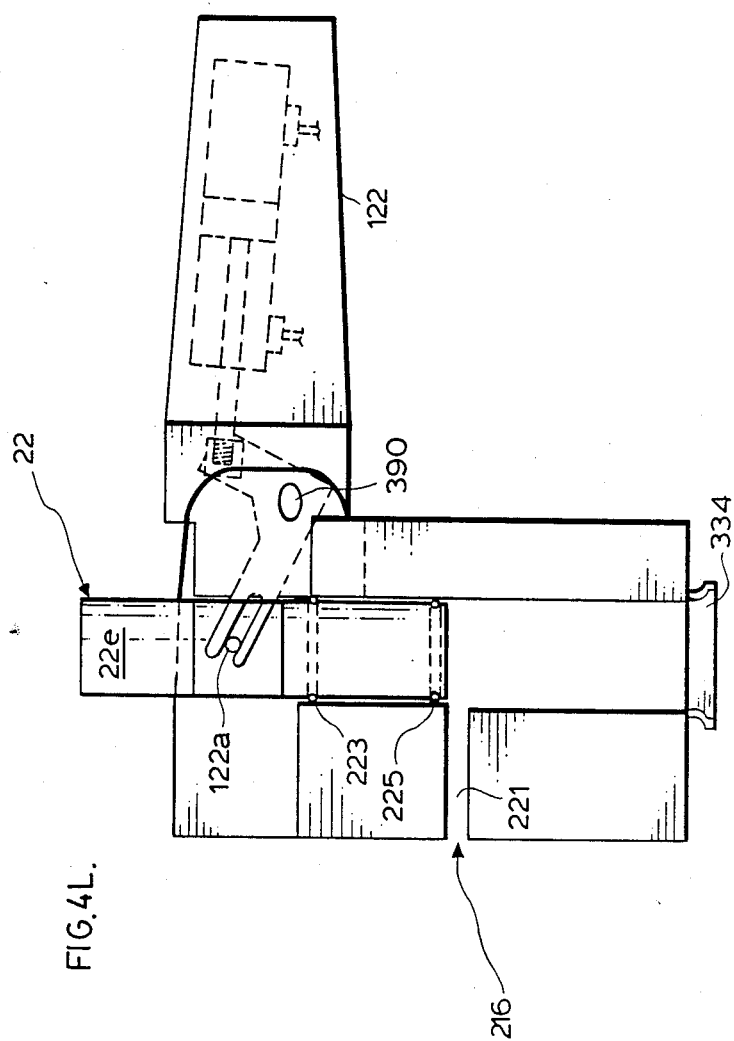
Figure 4M:
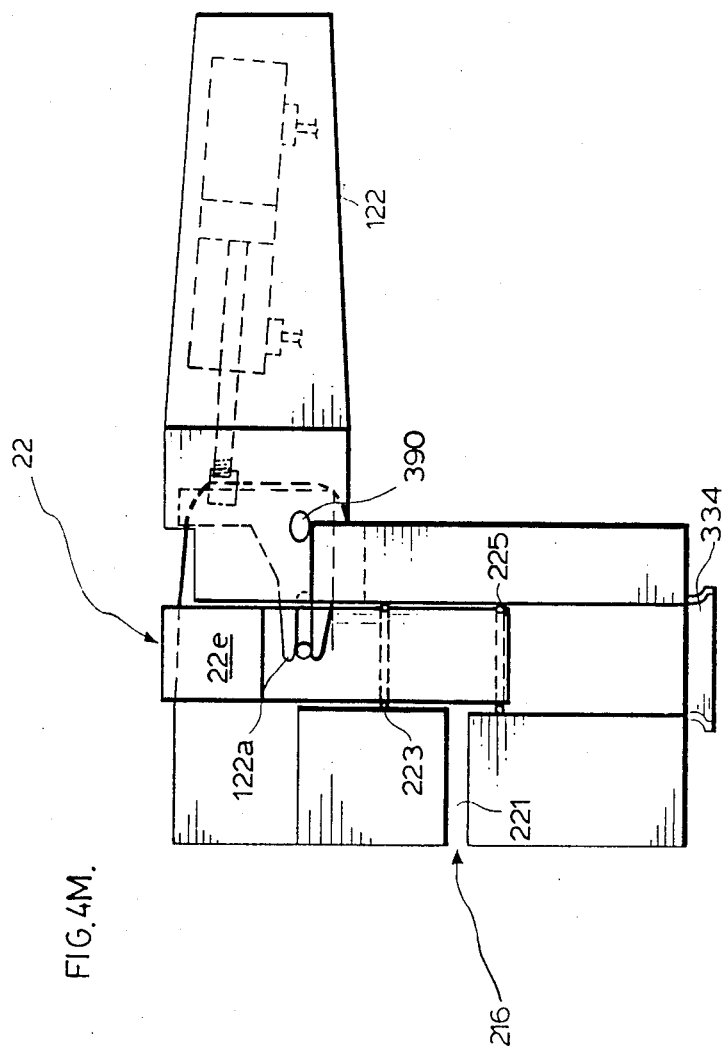

FIG. 4L is a sectional view, corresponding to section line BB in FIG. 4I, of a cone draw valve 22 being opened by an automatic actuator 124. As shown, when the draw valve is in the open position, the draw plunger 22e is pushed up, opening the passageway 221 from the cone inlet port 216. This allows dispensing of cone product through outlet. FIG. 4M is a similar sectional view showing the cone draw valve 24 being closed by the automatic actuator 122. Passage way 221 is closed off by spaced-apart o-ring seals 223 and 225.

Purge Valve

Figure 4N:
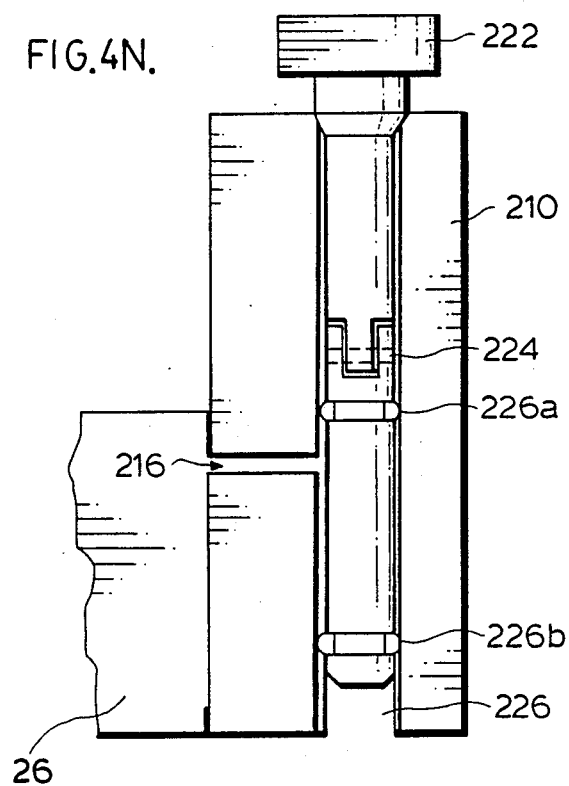

Referring to FIG. 4N, the purge valve in the cone and shake doors is a shaft 220 with an inlet port 216 in fluid connection with the ice cream or shake barrel. Although not shown in these Figures, in the prior art, the purge valve opening is plugged by a straight plug which can be lifted high enough to open the inlet 216, but cannot be lifted high enough to remove the plug entirely from the shaft 220 because the door 210 is installed in such a way that the plug's vertical movement is limited by a panel above the door 210, unless the entire door 210 is removed from its mounting.

During normal operation, the seals of the cone barrel 26 and the shake freezer barrel 28 are protected from overpressure. The cone pump 30 is turned on when a pressure switch at the end of the cone pressure line 32 detects a low pressure condition, and the shake pump 36 is turned on by activation of any of the microswitches 24d when a shake draw valve 24 is opened.

During cleaning, however, the cone and shake pumps 30 and 36 are turned on and off by signals K2 and K3 from the CIPS. To prevent the build up of pressure in the cone and shake freezers which would harm the CSD, the inventors have developed two new purge valves. The purge valve 222 shown in FIG. 4N is a plug intended for use during normal dispensing operations. This valve 222 has a hinge 224 that enables its removal, and two o-ring seals 226a and 226b for preventing fluid transit either up or down the purge shaft 220.

When the CSD 18 is set up for cleaning, the purge valve 222 shown in FIG. 4N is removed and replaced with the purge valve 230 shown in FIGS. 4O and 4P. This purge valve 230 does not plug the purge shaft 220. Instead, it is purposely made not to fill completely the shaft 220, thereby allowing liquid from the barrel 26 to escape downward through to bottom end of the shaft 220. The purge valve also has an internal passageway 231, starting with a port hole 232 near the valve's hinge 234 which allows fluid from the barrel 26 to flow through the passage way 231 and out through a discharge tube 236 into the drain pan 100 on the front of the SD 18. An o-ring seal 238 prevents fluid from exiting the top of the shaft 220, except through the discharge tube 236.

If the normal purge valve were not removed during cleaning, the purge shaft 220, which becomes contaminated with shake/cone mix would not be cleaned. If the purge valve were merely removed during cleaning, the cleaning solution would not travel through the draw valves because it would be exhausted through the purge valve, and the draw valves would not be cleaned.

Thus the purpose of the CIP (clean in place) purge valve 230 is to (1) limit the back pressure in the barrel to around five psi, to prevent damage to the dispenser's seals and internal tubing, and yet permit cleaning of the draw valves, and (2) to permit a sufficient flow of fluid through the port 216 and purge shaft 220 to clean these parts of the CSD machine. Also, the vented purge valve 230 eliminates air that the mix pumps 30 and 36 inject into the cleaning solution. During normal operation the mix pump injects air into the shake/cone mix to provide a smooth creamy texture to the ice cream, but this air must be removed to facilitate the cleaning of the top of the barrels and the backs of the cone and shake doors. Without the elimination of air from the barrels during cleaning, an air pocket would remain in the barrels and would inhibit the cleaning chemicals from coming into contact with the upper surfaces inside the barrels.

Controller: Hardware

Figure 5:
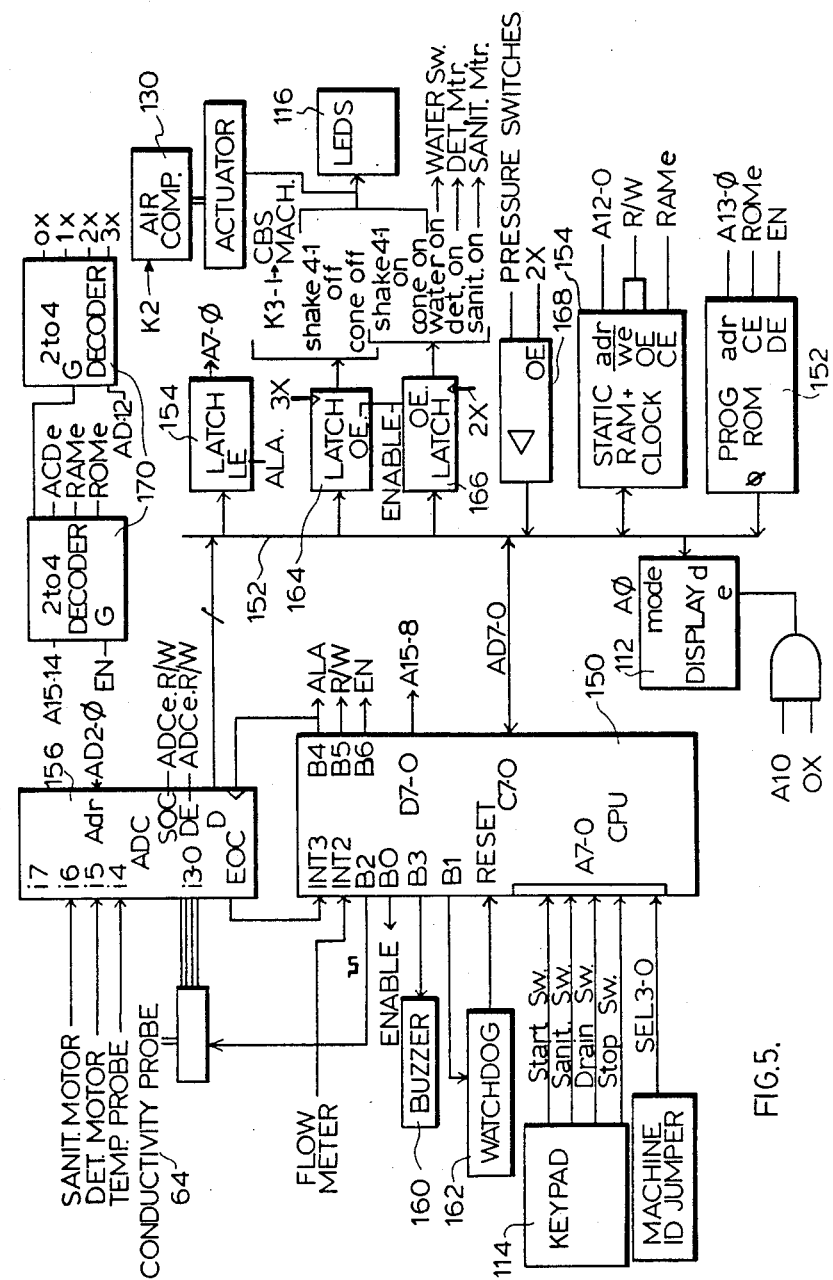

Referring to FIG. 5, the central component of the controller 50 is a central processing unit (CPU) 150, which is a model TMS 70C00 microcontroller made by Texas Instruments in the preferred embodiment. The software for the CPU 150 is stored in a read only memory ROM 152. A battery backed static RAM and clock chip 154 (e.g., either Mostek part 48T02 or Dallas part DS1216C) provides a real time clock and also a nonvolatile memory for storing data. In the preferred embodiment, scratch pad memory is provided by the microcontroller 150.

The microcontroller 150 has four ports A, B, C and D. The A port receives logical input from the four keys on the control panel's keypad 14, and a four bit identifier SEL3-0 from the machine ID jumpers in the CSD's control box 34.

The B port is used to output several control signals (Enable, EN, R/W and ALA), a buzzer signal, a watchdog signal, and a conductivity probe signal. The purpose of each of these signals will be explained below.

The C port is coupled to the controller's data bus 152, and the D port outputs the top half of the system's address bus A15-A8. The lower half of the address bus A7-A0 is generated by enabling the ALA signal (on line B4 of the B port) and thereby latching the contents of the data bus 152 in latch 154.

The microcontroller 152 also has one internally generated interrupt (INT2, a timer interrupt that occurs every 0.4883 milliseconds) and two externally generated interrupts: INT1 generated by the water flow meter 44, and INT3 generated when the controller's analog to digital converter (ADC) 156 completes the conversion of an analog input signal.

A buzzer 160 is provided so that the system's user can be alerted when a problem arises—or if the cleaning process is complete. The buzzer 160 is controlled by a binary signal, B3, from the microcontroller's B port.

The watchdog circuit 162 is a typical activity monitor that resets the system, by pulsing the microcontroller's Reset line, if no activity is detected on the B1 line of the B port. As described below, the B1 line is normally pulsed once every 0.125 seconds, and thus the watchdog 162 is designed to generate a reset if it sees no activity on B1 for a period of approximately 0.5 seconds.

The display 112 is a four line LCD circuit (e.g., an LM044-L made by Hitachi). The display 112 is normally used to communicate the current status of the system 20 to the user, but it is also used to view the data log (reflecting the time of compleion and the problems encountered during previous uses of the system) stored in the system's nonvolatile memory 154.

Output latches 164 and 166 provide the control signals for the draw valve actuators (Shake4-1 On/Off, Cone On/Off), the CSD's cone and shake product pumps (K1 and K2), the shake spinners (K3), Water solenoid, detergent pump, and sanitizer pump. The draw valve actuator signals also go to the LEDs 116 on the control panel 110, showing the current position of each draw valve.

Logical (binary) input signals, representing the current state of the pressure switches on the five pumps 80–88, are read in by buffer 168 when mode signal 1X is active.

The controller's mode of operation is determined by a decoder circuit 170 which decodes the top four address lines A15–A12 as shown in Table 1.

TABLE 1

| A15–A12 value | Mode Signal | Circuit Enabled |
| --- | --- | --- |
| 0000 | 0X | Display |
| 0001 | 1X | Logical Input Buffer |
| 0002 | 2X | Output Latch 166 |
| 0003 | 3X | Output Latch 164 |
| 01-- | ADCe | A-to-D Converter |
| 02-- | RAMe | RAM and Clock 154 |
| 03-- | ROMe | Program ROM |

The ADC 156 works as follows. An input address between seven and zero is latched in from data bus lines AD2-0 whenever the ALA signal (from port B, line B4) goes high. The analog signal on the ADC's input port at the specified address is sampled for conversion when the ADC's SOC line goes high—which happens when ADCe is high and R/W is low. When the ADC 156 completes the conversion process it generates a signal on its EOC (end of conversion) line—which activates the INT3 line on the microcontroller 150. This calls the INT3 interrupt routine, which sets ADCe high and R/W high so that the ADC's digital output is enabled (because its OE line goes high). The microcontroller reads the digital value generated by the ADC from the data bus 152, and stores this value for later use. A more detailed description of how each analog input signal is processed is provided below in the sections describing the corresponding portions of the control software.

FIG. 5A shows that each of the syrup line pumps 82–88 is turned on when its corresponding pressure signal is low, and that the cone line pump 80 is turned on when it pressure signal is low and the fourth syrup line pump 82 is also on (thereby reducing the duty cycle of the cone line pump and reducing the amount of stress on the cone pressure line 32.

Conductivity Measurement Circuit

Figure 6:
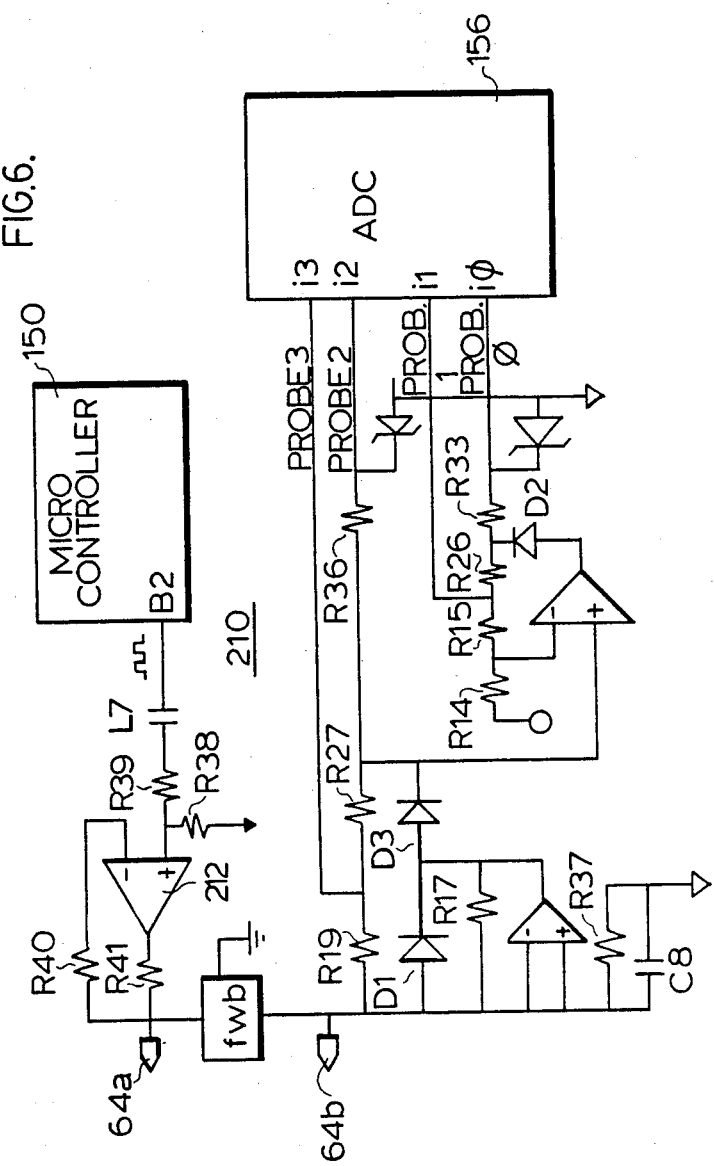
FIGS. 6 and 6A show two conductivity measuring circuits.

Referring to FIG. 6, the conductivity measurement circuit 210 works as follows. A one kilohertz square wave is generated by the microcontroller 150 on port B2, which is a.c. coupled to conductivity probe 64a through an RC filter C7-R39-R38 and amplifier 212 (with feedback resistors R40 and R41).

The basic operation of the conductivity probe is as follows. The controller 50 periodically samples the conductivity of the medium between the conductivity probe's two elements. The resulting measurement is compared with a specified conductivity range to determine if the fluid in the tank 40 is within the specified concentration range. In the preferred embodiment, an allowed conductivity range is specified for every "step" of the cleaning process. Thus the system can test the concentration of a detergent solution, the concentration of a sanitizer solution, and the purity of rinse water. Furthermore, since the detergent and sanitizer chemical solutions typically have nonoverlapping conductivity ranges, the system will detect a problem if detergent is substituted for sanitizer, or vice versa.

The occurrence of a sudden voltage change on the first probe 64a causes current to flow between the first and second probes 64a and 64b. The resulting signal on the second probe 64b is proportional to the conductance of the water solution in the mix tank.

In order to minimize the effect of the water's capacitance on the conductivity measurement, the signal on the second probe 64b is measured as soon as possible after the voltage change (from a high voltage to a low voltage) on the first probe 64a. With the microcontroller used in the preferred embodiment, the second probe signal is measured (i.e., sampled and held by ADC 156) approximately ten microseconds after the B2 square wave signal is toggled from a high to a low state.

The measurement circuit 210 divides the measurement into four conductivity ranges because an 8-bit ADC is used, and the range of conductivity levels which need to be measured requires more than eight bits of accuracy. Four distince signals Probe3–Probe 0 are generated and are read by the microcontroller 150 through the i3–i0 ports of the ADC 156. Each of the four conductivity signals is proportional to the mix tank water's conductivity when the conductivity is in a corresponding range.

In an alternate embodiment of the invention, a 12-bit ADC could be used, which would increase the cost of the system. In this embodiment a single conductivity measurement could take the place of the four used in the preferred embodiment and, as will be understood by those skilled in the art, the corresponding circuit 210 would be considerably simplified.

Both probes 64a and 64b are coupled to a full wave bridge rectifier solely for the purpose of using the diodes therein to clamp both probes to a voltage not greater than approximately 0.5 volts higher than the system's ground voltage. This protects circuit 210 from transient and/or extraneous voltages.

The Probe3 signal is used for measuring the highest range of conductivity values, the Probe2 signal is used for measuring the next lower range of conductivity values, and so on. Each step down to a lower range of conductivity signals increases the measurement's sensitivity to the water's conductance by a factor of approximately 2.72 (i.e., $e^1$). Thus if a value of ten was measured in input-3 to the ADC, the corresponding values would be approximately 27.2 on input-2, 73.0 on input-1 and 201.2 on input-0.

Figure 6A:
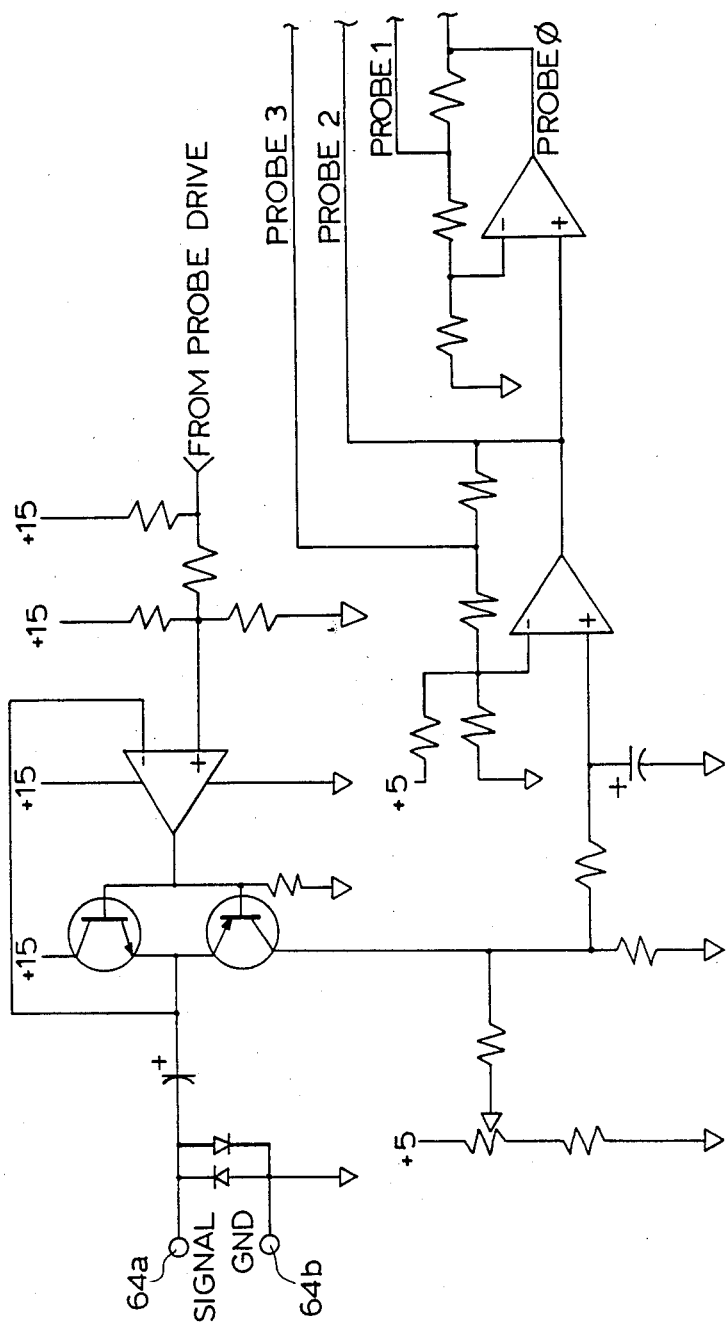

FIG. 6A shows an alternate conductivity measurement circuit which also produces four ranges of conductivity signals Probe3-0, but which is less dependent on quick sampling of the Probe3-0 signals after the drive signal B2 is toggled.

Control Software

Figure 7:
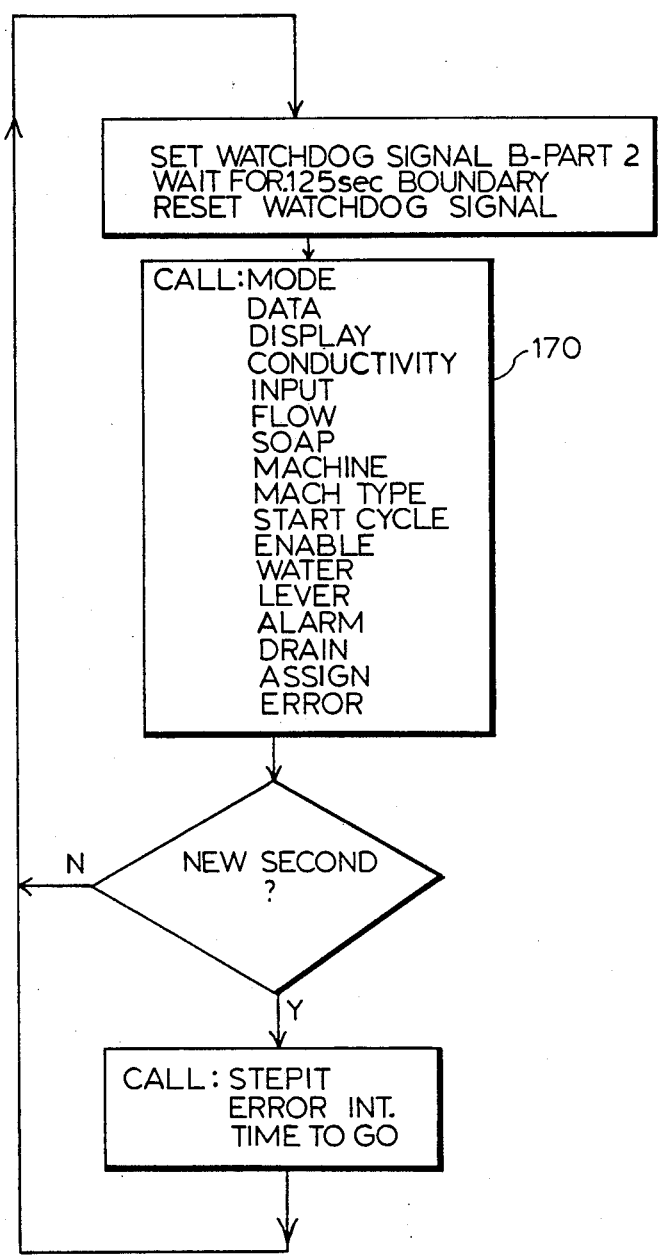
FIG. 7 is a flow chart of the control program for the controller in the preferred embodiment.

FIG. 7 shows a flowchart of the main loop for the CIPS's control program. The main loop is executed once every 0.125 seconds. After the loop finishes execution, the watchdog signal (line B1 of port B) is set. Then the system waits for the next 0.125 second boundary, resets the watchdog signal, and begins execution of the routines called in box 170.

Once each second (box 172) the routines named in box 174 are called.

Task Sequencing: Step Program

Figure 8:
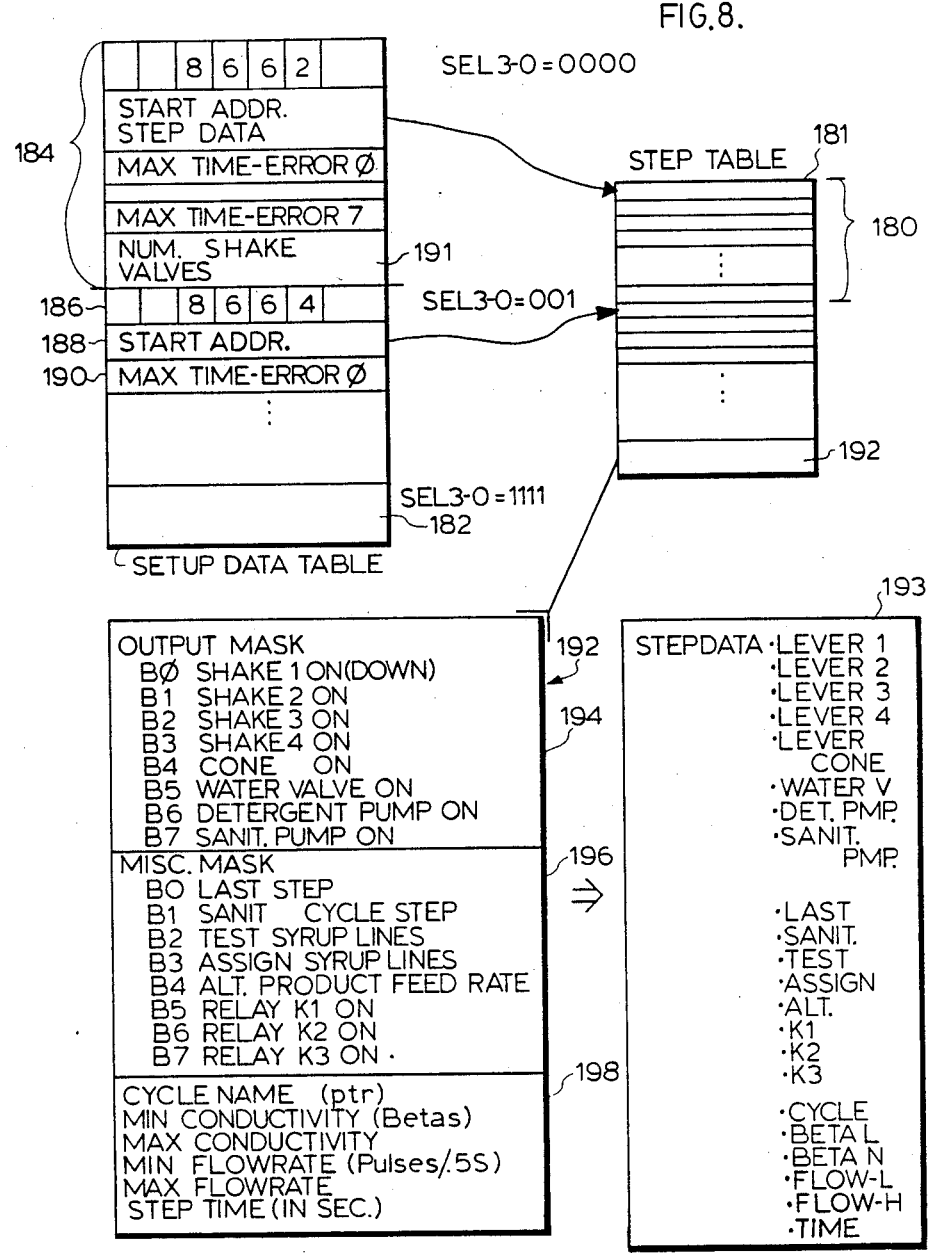
FIG. 8 depicts the setup and step data structures used to control the sequence of tasks performed by the clean in place system.

Referring to FIG. 8, there is a specified sequence of cleaning steps 180 for each cone/shake configuration that the CIPS 20 can handle. All of the cleaning steps, for all of the CSD configurations, are stored in a data structure called the Step Table 181. In the preferred embodiment the configuration is identified by the value of SEL3-0.

The Setup Data Table 182 has sixteen entries 184 for the sixteen possible values of SEL3-0. The entry 184 for each CSD configuration contains the following information: a seven character string (seven ASCII characters) 186 which identify the CSD model or configuration; the address 188 of the first step of the cleaning process for this CSD configuration; a set of time threshold values 190 which specify the maximum length of time that each of eight error conditions can persist before the condition will be denoted as a persistent error; and the number of shake draw valves 191 in the CSD configuration. A list of these error conditions is shown in Table 2.

TABLE 2

| Error # | Description of Error Condition |
|---|---|
| 0 | Mix Pump Flow Problem |
| 1 | Water Supply Problem-Flow Rate Too Slow |
| 2 | Low Water Temperature |
| 3 | Sanitizer Supply Problem |
| 4 | Detergent Supply Problem |
| 5 | Leaking Syrup Line(s) |
| 6 | Clogged Syrup Line(s) |
| 7 | Clogged Drain Line |

Note that any step program 180 could be used for two or more configurations, simply by using the same start address 188 for each of those configurations.

Each step 192 in the step table 180 contains eight bytes of information. This information is copied into the StepData data structure 193 shown in FIG. 8 when the system is ready to "execute" or use the step.

The first byte 194 of each step contains eight on/off control bits for the shake and cone actuators, the water valve 42, the detergent pump 52, and the sanitizer pump 54. Note that while the five shake and cone actuator bits are noted in FIG. 8 as being for four shake actuators and one cone actuator, the division of these bits between shake and cone actuators will vary from CSD configuration to configuration.

Before explaining the items in the second byte 196 of the step data structure 192, the following background information is provided. First, each step program has many steps, and the last step is marked with a "LAST step" flag so the system will known that the cleaning program is finished.

Second, a typical step program includes rinsing, detergent, sanitizing, and draining steps. In most restaurants the full step program will be run each night, but only the sanitizing and draining steps will be run in the morning before the cone/shake maker is used. One of the keys on the control panel is marked "Sanitize Only". Pressing this key instructs the CIPS to perform only those steps flagged as a "sanitize cycle step".

Third, the syrup lines can be tested for leaks and blockage by testing the pressure switches 92 on the pumps. Leaks are indicated by low pressure signals for draw valves that are programmed to be closed, and blocked lines are indicated by high pressure signals for draw valves that are programmed to be open.

Fourth, the pressure switches 92 can also be tested at the beginning of the step program to determine which pump 80-88 (and cleaning line) is coupled to the same syrup channel as each of the draw valve actuators 124. This is done by activating one actuator, thereby opening one syrup draw valve, and testing to see which pressure switch indicates a low pressure condition.

Fifth, the detergent and sanitizer pumps can be driven at two different rates: the so-called normal rate for mixing the chemical with water "on the fly", and a faster "alternate" rate for initially adding the chemical to clear water.

The second byte 196 of each step contains on/off control bits for the K1, K2 and K3 relays, and five flags for indicating: (B0) if this is the last step of the step program, (B1) if this step is to be used when a "Sanitize Only" cycle is running; (B2) if the syrup lines should be tested for leaks; (B3) if the system should test the pressure switch signal to determine which syrup pump 80-88 corresponds to the shake draw valve which is currently open (i.e., on or down); and (B4) if an alternate product feed rate should be used for the duration of this step.

The last six bytes 198 of each program step contains: (1) a pointer to a line of text to be displayed on the second line of the display, which identifies the cleaning step currently being performed; (2 and 3) the minimum and maximum acceptable conductivity of the solution in the mixing tank; (4 and 5) the minimum and maximum acceptable flow rate of water into the mixing tank; and (6) the duration of this step.

Thus, a different conductivity range can be specified for each step of the cleaning process. This enables the system to detect problems with the rinse water, the amount of detergent in the water, and the amount of sanitizer in the water.

Typically, the water supply must be able to provide water at a rate of at least three gallons per minute. In the preferred embodiment, water flow is measured in units of "flowmeter pulses per half second". Since the flow meter generates 1160 pulses per liter, each flow unit represents approximately 0.1 liters per minute (which is equivalent 0.027 gallons per minute, or 3.5 ounces per minute) for the particular flowmeter being used in the preferred embodiment.

Data Structures

Referring to FIG. 9, logical (i.e., binary) input signals are stored in two variables, called VALIDIN0 and VALIDIN1. Each bit of these variables can be referenced as follows: bit n of VALIDIN0 is represented herein as VALIDIN0.bn. The value represented by each of the logical input signals in shown in FIG. 9. Generally, each component of a data structure is referenced herein as VariableName.Component.

As shown in FIG. 9, the logical input signals are debounced or integrated before being stored in the data structures VALIDIN0-1 for validated logical input signal. Also, changes in the validated data are denoted in two data change data structures Datachange0-1, so that the control software can respond to changes in input signals (e.g., by responding only when a key on the control panel is first pushed). The logical INPUT routine which handles the input signal debouncing and integration process is discussed below.

FIG. 10 shows the FlagReg data structure used to keep track of the current status of the system. The bits of this data structure are referenced as FlagReg.CycleOn, FlagReg.Assigned, and so on. The role of each bit flow is shown in FIG. 10 and is further explained below.

FIG. 11 shows the data structures used to store the output signals which control the draw valve actuators, the water value, the detergent and sanitizer pumps, and the K1-K3 relays. These data structures are periodically latched into the output latches 164 and 166 shown in FIG. 5.

Figure 12:
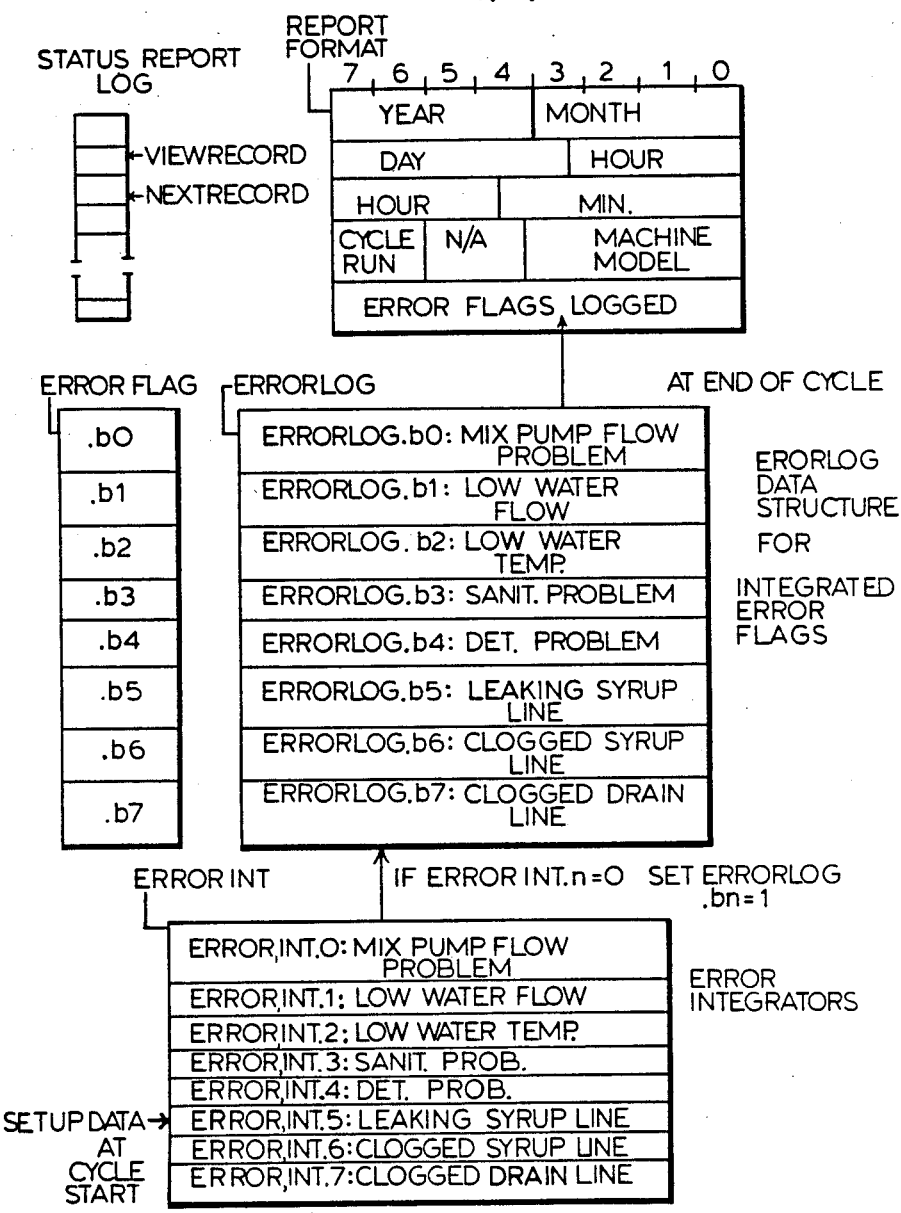
FIG. 12 depicts the data structures used to keep track of error conditions, and also the data structures used to store records of completed and aborted cleaning cycles.

FIG. 12 depicts the ErrorFlag, ErrorLog, and ErrorINT data structures used to keep track of error conditions, and also the Status Report Log data structure used to store records of completed and aborted cleaning cycles.

Each bit of the ErrorFlag register is used to indicate the presence of an error condition at the current time. The ErrorINT data structures is a set of down counters used to determine if the amount of time that each error condition has persisted exceeds a specified time limit. When any of the ErrorINT integrators reaches a value of zero, the corresponding error is marked as a persistent error in the ErrorLog data structure. The eight error conditions tracked by the system are indicated in FIG. 12.

When a cleaning cycle is completed, or automatically aborted by a clogged drain condition, a record of the cycle is stored in the system's nonvolatile memory. The data structure which stores this information is called the Status Report Log, and it has room for 366 reports. Each report indicates the data and time the cycle ended, the type of cycle that was run, the model of the cone/shake maker that was being cleaned, and the error flags logged as persistent errors during the cleaning cycle.

Once a report has been stored, the user cannot alter the report. In fact, the only way that new data can be recorded is by running a cleaning cycle. When the Status Report Log is full, each new report overwrites the oldest report in the Log. If the CIPS is used once a day, the Status Report Log will hold one full year of status reports.

The format for each report is shown in FIG. 12. As indicated in FIG. 12, the error flags stored in each report comprise a copy of the ErrorLog data structure at the end of the cleaning cycle.

FIG. 13 depicts the LEVERREG data structure for denoting which syrup line pump corresponds to each shake draw valve actuator used in the preferred embodiment.

Pseudocode

Tables 3-17 contain pseudocode representations of some of the routines described below. The pseudocode is, essentially, a computer language using universal computer language conventions. While the pseudocode employed here has been invented solely for the purposes of this description, it is designed to be easily understandable to any computer programmer skilled in the art. The computer programs in the preferred embodiment are written in the assembly language for the (model TMS 70C00) microcontroller used therein.

The following notes on the syntax of this pseudocode:

Comments. Comments, i.e., nonexecutable statements, begin with "--". All text on the rest of that line, after a "--", is a comment.

Multiline Statements. Statements continue from line to line as needed.

If Statement. There are two versions. For the one statement version the syntax is:

```
If -condition- -statement-.
For the block statement version the syntax is:
If -condition-
-block of statements-
Else                    -- optional
-block of statements-   -- optional
Endif
Loops. The syntax for loops using an incrementing or
decrementing counter is:
Loop for I = 1 to X
-block of statements
EndLoop
```

INT1: Flow Meter Interrupt

Every time 0.862 milliliters of water flow past the flow meter 44 it generates a pulse that makes the microcontroller 150 call its "Interrupt #1" subroutine (called INT1 in the Figures). This routine simply increments a variable called FLOWCNT, which is later used to determine the amount of water added to the mixing tank.

INT2: Timer Interrupt

The microcontroller generates an internal timer interrupt approximately every 500 microseconds (actually once every 0.4883 milliseconds, so that there will be 2048 interrupts per second), which calls the "Interrupt #2" (INT2) subroutine. Table 3 contains a pseudocode representation of this timer interrupt routine.

The tasks performed by the timer interrupt are as follows. The conductivity probe signal, line B2 of the B port, is toggled—thereby generating a one kilohertz square wave.

Pump control. Both the detergent and sanitizer pumps are positive displacement pumps with d.c. motors. The speed of these pumps is controlled by measuring the back emf of both pumps, comparing the measured value with a preselected target speed value, and then adjusting the width of the pump's drive pulse accordingly. The widths of each drive pulse is controlled by a pulse width counter. Whenever one of the pumps is running, its pulse width counter is set to a calculated value once every 32 milliseconds and its drive pulse is turned on. Then its pulse width counter is decremented every 500 microseconds until the counter reaches zero, at which time the drive pulse is turned off until the next 32 millisecond time slot.

ADC input. Every 500 microseconds an interrupt counter INTCNT is decremented. The ADC is programmed to convert one of its analog inputs only if the two least significant bits of INTCNT are zero and the value of bits 5-2 of INTCNT (INTCNT.b5-2) is less than twelve. To start the ADC, it is sent an input address of INTCNT.b4-2 and a "start conversion" signal.

Thus, for every sixty-four timer interrupts, each of the four conductivity probe lines will be sampled two times, and the other lines will be sampled one time.

Output Buffers. Every time the timer interrupt runs, the output control signals in Latches 164 and 166 are updated by sending the data in the DATAOUT0 variable to Latch 166, and sending the data in the DATAOUT1 variable to Latch 164.

INT3: End Of ADC Conversion Interrupt

The "interrupt #3" routine is called when the ADC generates and "end of conversion" signal. The task performed depends on the input signal converted by the ADC, which was determined by the value of bits 2, 3 and 4 of INTCNT.

For the four probe signals, the converted digital value is just added to a corresponding accumulator—which helps adjust for noise in the conductivity probe. The conductivity routine, discussed below, periodically averages the accumulated probe signals.

For temperature, the converted digital value is compared with low and high limits. If the converted digital value is within these limits, the measurement value is converted to a Celsius temperature value by finding the closest value in a temperature lookup table, and then the temperature is stored in a variable called TANKTEMP. Otherwise a low or high flag value is stored in TANKTEMP.

For the detergent and sanitizer pumps, the converted digital value corresponds to the strength of the back emf from the pump. If, however, the pump is not scheduled to be on, then the measurement is ignored. Otherwise an error signal is developed by subtracting the measured back emf from a target value. Then a new drive pulse width is calculated and the drive pulse is set to turn on for a period of time equal to the calculated pulse width. The new pulse width is calculatd to be:

$$PWM = G1*Spd + G2*E + G3*dE/dT + G4*\int E\,dt$$

where Spd is the target pump speed, E is the error signal, dE/dt is the derivative of the error signal (or E—the previous value of E) and $\int E\,dt$ is the integral of E. A pseudocode version of the Interrupt #3 routine is shown in Table 4.

MODE Routine

Referring to FIG. 3, the STOP button on the control panel can be used to control the mode of the CIPS 20, but only when the system is not in the middle of a cleaning cycle. By holding down the STOP button for 5 seconds, the system is put in "Interrogation Mode"—for reviewing records of past cleaning cycles. Holding the STOP button for 10 seconds puts the system in "Program Mode", which is used for programming the data and time stored in the system's clock.

In Interrogation Mode, the user can review the status reports stored in the system's memory for the last 366 completed (or automatically aborted) cycles. Note that in the preferred embodiment, manually stopped cycles and Drain Only cycles are not logged.

The format for storing status reports is shown in FIG. 12. The log has 366 slots which are used serially, wrapping back around to the top when the last slot has been used. A pointer called NextRecord points to the slot to be used to store the next status report, and a pointer called ViewRecord points to the record to be shown on the Display in Interrogation Mode.

As shown in FIG. 12, each status report occupies five bytes of memory and specifies the data and time that the reported cycle was completed or stopped, the type of cycle that was run (e.g., full cycle, or sanitizer cycle), the model of the cone/shake maker that was being cleaned, and error conditions detected during the cycle.

DATA Routine

The data routine is used only in Interrogation and Program Modes. This routine lets the user use the buttons on the control panel in much the same way as the buttons on a digital watch which includes an internal notepad memory.

In Interrogation Mode, the user moves through the records in the status report log by using the Cycle Start button to move backwards in time (upwards in the log) and the Sanitize Only button to move forwards in time.

The first four line display for a selected status record shows the date, time, cycle type and machine model for the logged cycle. The Drain Only button is used to access two additional displays: the first display shows the logged status for the first four stored error flags, and the second display shows the last four stored error flags. Continued use of the Drain Only Button cycles the display through all three displays for the record.

The Stop button is used to return to Normal Mode—from which a new cleaning cycle can be started.

In the preferred embodiment, the system is automatically put into interrogation mode at the end of each cleaning cycle that results in the storage of a status record (i.e., a full cleaning cycle, or a sanitize only cycle).

In ClockSet Mode, the date and time are displayed. As with many digital clocks, one button (here the Drain Only button) is used to select the portion of the date/time to be updated (hour, minute, second, month, day, year) by pushing the button until the display indicates that the item to be updated has been selected. The selected date/time item is denoted by flashing it on and off two times per second. Once the item to be changed has been selected, the Cycle Start button is used to increment the item, and the Sanitize Only button is used to decrement the item.

DISPLAY Routine

The Display routine controls the contents of the display, which depend on the system's mode of operation. In Normal Mode, the content of the display is generally as shown in FIG. 3. The first display line identifies the model number of the cone/shake maker connected to the system. The text following the words "MODEL NUMBER" is taken from the Setup Table shown in FIG. 8, using the SEL3-0 signal as an index.

The second line of the display, in Normal Mode, displays the text pointed to by the Cycle Name pointer in the step 192 currently being run. If no step is being run (e.g., when the machine is not running a cleaning cycle), this line remains blank.

The third line of the display shows the amount of time left to go before the current cleaning cycle will be done. This is derived from a variable called TimeToGo, which is updated once a second during cleaning cycles.

The fourth line is a message line which indicates what, if any, error conditions have been detected during the current cleaning cycle—as specified by the Error Flag Register shown in FIG. 9.

Table 5 is a table of display messages, including the error messages used on this fourth line in Normal Mode.

In Interrogation Mode, the Display routine unpacks the data stored in the Status Report Log and formats it for display, as described above in the discussion of the Mode and Data routines.

In Clockset mode the Display routine displays the current date and time, and updates the display as the user programs in a new date and/or time. Also, the date/time item selected for updating is flashed on and off twice per second.

CONDUCTIVITY Calculation Routine

The four outputs Probe3–Probe0 of the conductivity circuit 210 (see FIG. 6) are sampled and digitized by the system's ADC approximately once every 16 milliseconds, under the control of the INT2 and INT3 routines as discussed above. These measurements are averaged by adding all 32 measurements for each signal in corresponding accumulators PRB3–PRB0, and then dividing the accumulated results by 32.

Once every half second, each Probe sense value has been sampled 32 times, a conductivity value is calculated based on this data. The pseudocode for the conductivity calculation is shown in Tables 6 and 7.

Since relatively low value measurements are subject to more noise than those in the middle of their dynamic range, the preferred method of the invention is to select the highest sensitivity conductivity signal which has a value below the maximum level for that signal. The dynamic range of the ADC is eight bits, or zero to 255. In the preferred embodiment, the Probe3 through Probe1 signals are not used unless their value exceeds 75, and even the Probe0 signal is rejected as noise unless its value exceeds 36.

Logarithmic Scaling. In the preferred embodiment conductivity is measured in logarithmically scaled units called Beta units. This provides a conductivity (and cleaning agent concentration) measurement mechanism which is accurate over a wide range of conductivity (concentration) levels. Each Beta unit corresponds to approximately a five percent (actually a 5.12711%) increase in the conductivity of the mix tank water, which corresponds approximately to a five percent increase in detergent or sanitizer concentration. Twenty Beta units represent a change in conductivity of 271.8%, and each of the ProbeX measurement signals output by the Conductivity circuit 210 are offset from its neighbors by twenty Beta units.

The conductivity measurements are also temperature adjusted because temperature affects the conductivity of water solutions. One advantage of the logarithmic conductivity measuring method is that it allows the system to be easily recalibrated if the detergent and/or sanitizer chemicals are changed. Most aspects of the present invention could be implemented using a linear conductivity measuring method, but the logarithmic method used herein is clearly preferred.

Conductivity Calculation. Referring to Tables 6 and 7, the Conductivity calculation routine runs once each half second. After the average Probe3 through Probe0 values have been calculated, the routine calculates a logarithmically scaled conductivity value in "Beta" units. To do this the routine looks for the highest range ProbeX signal (from the conductivity circuit 210) which is in a predefined reliable measurement range (e.g., values greater than 75) and assigns an "Abscissa" value corresponding to the selected Probe measurement range. The Abscissa for each ProbeX sense value differs from its neighbors by 20 Beta units.

The routine then calculates a "Mantissa" value by finding the largest value in the LogTb1 lookup table (shown in Table 7) which is less than the selected ProbeX value and assigning the index of that value to the Mantissa.

The conductivity value in Beta units is equal to the sum of the Abscissa and the Mantissa. However, this value is adjusted by 1.8% (0.36 Beta units) for each degree Calsius:

$$Beta = Abscissa + Mantissa + 0.36(TANK\text{-}TEMP - 25).$$

INPUT Routine

Referring to FIGS. 5 and 9, the INPUT routine reads in and debounces the logical (i.e., binary) inputs to the controller 20. The inputs to the microcontroller's A port—the Keypad inputs and the model selection signals SEL3-0 (see FIG. 5)—are initially stored in a variable called RAWIN0. If these inputs have the same values as during the last call to the INPUT routine, the inputs are copied into a variable called VALIDIN0 (see FIG. 9). Thus these signals have be steady for at least 0.125 seconds to be stored in VALIDIN0.

If the A port inputs are not the same as they were on the last pass through the main loop, the signal values are stored in a variable called LASTA for use during the next main loop call to the INPUT routine. Also, whenever a new keypad key is pressed by the system's user, the corresponding bit is set in a data structure called DataChange0 (and the system's beeper is activated for 10 milliseconds to assure the user that the system received the user's command). The flag in DataChange0 is cleared by which ever routine (such as the Data routine discussed above) responds to the key stroke.

The INPUT routine also debounces the six pressure switch signals (for the four syrup lines, the cone pressure line, and the drain line) input to buffer 168 (see FIG. 5) by integrating each of the pressure switch signals. The procedure works as follows: for each of the six pressure signals, an integrator is incremented if the signal is high, and is decremented if the signal is low, once each main loop pass.

The integrators are clamped on the low end at zero and at twenty-four on the high end. Further, when an integrator hits the top clamp value the corresponding validated input flag, called VALIDIN1.bX (where X identifies the pressure switch), is set high, and when the integrator hits the bottom clamp value the corresponding flag is set low. Thus each switch flag is debounced in that the switch flag remains at its current value until the corresponding switch maintains the opposite state for at least three seconds (twenty-four main loop cycles). Finally, whenever a new "1" bit is written into VALIDIN1, the corresponding bit is also set in DataChange1. The pseudocode for the INPUT routine is shown in Table 8.

FLOW Routine

The FLOW routine, which runs once each half second, computes a total water flow value FLOWOUT, and a flow rate FLOWRATE from the number of flow meter pulses FLOWCNT received during the last half second. As described above, the flow meter generates one pulse for each 0.862 milliliters of water which flow into the mix tank from the water supply. The pseudocode for the FLOW routine is shown in Table 9.

SOAP Routine

This routine computes a motor speed for either the detergent or sanitizer pump, if either one is enabled. The computed motor speed is equal to the water flow rate into the mix tank times a calibration constant. Different calibration constants can be provided for the detergent and sanitizer pumps, and alternate calibration constants can be provided for precharging the mix water at a faster rate. The computed speed is then averaged with the previous motor speed to smooth motor speed changes. The pseudocode for the SOAP routine is shown in Table 10.

MACHINE Routine

This Routine simply puts the K1, K2 and K3 control bits from the current step (in the step table) into the DATAOUT1 variable, so that the spinners (K1), shake pump and mixer (K2), and cone pump and mixer (K3) in the cone/shake maker will be turned on and off according to the schedule in the step table 181.

MACH-TYPE Routine

This routine, which runs only when the system is not in the middle of a cleaning cycle, copies the debounced model identification signal SEL3-0 from the lower nibble (i.e., 4 bits) of VALIDIN0 (see INPUT routine) into a variable called MACHINE, which is used to index into the Setup Data Table 182 (shown in FIG. 8).

START-CYCLE Routine

This routine responds to the Cycle Start, Sanitizer Only and Stop buttons on the control panel when the system is in Normal mode. To start a normal cleaning cycle the routine finds the Set up data for the machine attached to the CIPS 20, and then initializes the StepData, FlagReg, TimeToGo, and error logging data structures.

For Sanitize Only cycles, the TimeToGo includes only steps flagged as sanitizer steps (StepData.Sanit=1).

When the Stop button is pushed, or no cycle is running, this routine clears the StepData, data output, and TimeToGo data structures, thereby making or keeping the system inactive. The pseudocode for the START-CYCLE routine is shown in Table 11.

ENABLE Routine

If a cleaning cycle of any type (full, sanitize only, or drain only) is currently running, then this routine sets the Enable signal (b0 on the B port). This enables the output latches 164 and 166 (see FIG. 5) which control the draw valve actuators, the cone/shake maker, the water valve, and the cleansing chemical pumps.

WATER On/Off Routine

This routine closes the water valve if (1) the drain line is plugged (i.e., if the drain pressure switch flag is on), (2) the system is not running a cycle, or (3) if the current step indicates that the water should be turned off. Otherwise, if a cycle is being run and the current step indicates that the water should be turned on, then the water valve is opened. The pseudocode for this routine is shown in Table 12.

LEVER Routine

This routine operates the shake and cone draw valves (sometimes called levers) according to the command data in STEPDATA. If the drain is clogged, however, all the draw valves are closed to minimize the flood. The pseudocode for this routine is shown in Table 13.

ALARM Routine

This routine turns on the buzzer at different beep rates for different error conditions. In order of priority the error conditions are:

| Detected Error | Buzzer/Alarm |
|---|---|
| clogged drain | on continuously |
| conductivity | 8 hertz |
| low water flow | 4 hertz |
| syrup line | 2 hertz |

If a clogged drain condition is detected, the buzzer is turned on and left on until the condition is cleared or the cycle is terminated.

If a detergent or sanitizer problem is detected (i.e, if the measured conductivity is outside the specified range) the buzzer is turned on and off at a rate of 8 hertz.

If the rate of water flow is less than a predefined rate, the buzzer is turned on and off at a rate of 4 hertz. If the syrup lines are leaking or clogged, the buzzer is turned on and off at a rate of 2 hertz. Finally, there is a one second buzzer flag FlagReg.Beep which causes the buzzer to sound for one second when it is set (e.g., at the end of a cleaning cycle).

DRAIN Routine

The purpose of a "drain only" cycle is to remove all water from both the mix tank and the cone/shake maker. A drain only cycle can be started only if the system is not in the middle of a cleaning cycle, and is not in Interrogate or ClockSet mode.

Under these circumstances, pushing the Drain Only button once will start a "Drain Pan Only Cycle", which activates the drain pump 104 for approximately one minute, with all of the draw valves closed. The purpose of a Drain Pan Only Cycle is to empty any excess water remaining in the drain pan 100.

Pushing the Drain Only button a second time will start a one step cleaning "Full Drain Only" program in which all the draw valves are opened, both mix pumps in the CSD 18 are turned on but the spinners are turned off, the water supply and cleansing chemical supplies are off, and the cycle is run for four minutes. The conductivity and flow rate limits are set to "don't care", and the display is set to display "Drain" for a drain cycle on line two of the display. The purpose of a Full Drain Only cycle is remove all of the water from the mix tank 40, the cone and shake freezer barrels, the various fluid lines in the system, and from the drain pan 100.

If the Drain button is pushed in the middle of a Full Drain Only cycle it has the same effect as pushing the Stop button—the cycle is stopped.

ASSIGN Routine

This routine runs only when the "assign" bit in the StepData for the current step is assigned. Its purpose is to assign syrup line pumps to their corresponding draw valve actuators. Also, only one draw valve can be open when this routine runs.

The routine works as follows. First the routine checks that only one draw valve is open. Then it looks at the pressure switch signals to find a syrup line which is at low pressure, and assigns that line to the draw valve which is open, by storing the syrup line number I for lever B in LEVERREG.B (see LEVERREG data structure in FIG. 13).

If none of the pressure switch signals are off, then a "clogged syrup line" error is flagged. Similarly, if more than one pressure switch signal is off, then a "leaking syrup line" error is flagged.

Once all the syrup draw valves appear to be assigned, the routine checks to see if any syrup line has been assigned to more than one draw valve. If this happens, a "duplicate assignment" error flag is set. Otherwise a "levers assigned" flag is set to indicate that the assignment process was successfully completed. The pseudocode for the ASSIGN routine is shown in Table 14.

ERROR Routine

When an error condition is detected, its presence is flagged in a register called ErrorReg. When the error pesists for at least a specified time threshold, this fact is logged in a register called ErrorLog. The ERROR routine detects error conditions; the ERRORINT routine determines if an error condition has persisted long enough to log it as a persistent error. This scheme is used because many error conditions are transitory condition caused by minor leaks, temporary or partial line blockages, mechanial stretching, and even electrical signal noise.

The ERROR routine looks for certain error conditions and sets the corresponding error flags in the variable called ErrorFlag. This routine runs only when the system is running a cycle. In drain cycles, only the drain pressure switch is checked.

During normal cleaning and sanitizer cycles, the ERROR routine performs the following tests.

First the rate of water flow into the mix tank is compared with the minimum and maximum flow rates specified for the current step. If the specified limits are the "don't care" values—zero for the minimum, and 255 (i.e., FFH) for the maximum, the flow rate test is skipped.

If the specified minimum flow rate is given a nonzero value, but the specified maximum is "don't care", the water flow test is a test of the capacity of the water supply. This test is generally run at the beginning of a cleaning cycle to make sure that the water supply will be sufficient. If the measured water flow rate is too slow, it is flagged as a Low Water Flow error in the ErrorFlag data structure (see FIG. 12).

If both the specified minimum and maximum flow rates in the step table are used (i.e., neither is set to "don't care"), then the system will check that the shake and cone mix pumps are drawing water at a reasonable rate. If the measured water rate is not between the specified limits, the flag called ErrorFlag.b0 is set to indicate that a "Mix Pump Problem" has been detected. Next, the water temperature is checked to make sure that it is at least 10 degrees Celsius.

If the sanitizer pump is enabled by the current step, the measured conductivity of the water (see the description of the CONDUCTIVITY routine above) is compared with the specified minimum and maximum conductivity values (StepData.Beta-L and StepData.Beta-H) for the step. If the measured conductivity is out of the specified range, a "Sanitizer Problem" is flagged in the ErrorReg.

Similarly, the conductivity is tested if the detergent pump is enabled, and a "Detergent Problem" is flagged if the measured conductivity is out of the specified range.

Finally, all of the pressure switch signals are checked. The syrup line switches are checked to make sure that their state corresponds to the position of the corresponding draw valve. In other words, the syrup line pressure switch signal should be equal to one (indicating a high pressure) for closed draw valves, and it should be equal to zero for open draw valves. If the pressure signal for an open draw valve is high, then the corresponding syrup line is clogged and the "Clogged Syrup Line" flag is set. Similarly, if the pressure signal for a closed draw valve is low, then the corresponding syrup line is leaking and the "Leaking Syrup Line" flag is set.

The cone pressure line should always be open (i.e., with pressure less than 15 psi) because the cone freezer barrel's CIP purge valve should keep the pressure in the cone freezer barrel substantially below 15 psi. As a result, the ERROR routine cannot check for leaks in the cone pressure line. Furthermore, the cone pressure line pump 80 (see FIG. 1A) runs only when the fourth syrup line pump is running. Therefore the ERROR routine checks for a clogged cone line by testing for a high pressure on the cone line only when the fourth system line pump 82 is running. The pseudocode for the ERROR routine is shown in Table 15.

STEPIT Routine

After each step of the cleaning process is completed, the STEPIT routine gets the data for the next step from the Step Table (see FIG. 8) if the cleaning cycle is not over.

The data for each step is copied from the Step Table into an eight byte data structure called StepData. When the last step of the cycle is done, a one second beep is generated by setting FlagReg.Beep.

Note that the first step for a cleaning cycle, which is actually a step of no duration (StepData.Time=0) is loaded into the StepData data structure by the CYCLE routine, as explained above. Thus, when a new cycle is started, all the levers will be up (closed) and the cleaning system will do nothing until the STEPIT routine picks up the data for the first step of the cleaning cycle.

For "sanitize only" cycles, the StepData.Sanit bit of each step is checked so that only sanitizer steps are used. The STEPIT routine serially checks each step in the step table until if finds a sanitizer step, or it reaches the last step of the cycle.

Also, whenever any of the draw actuators change position, a one second beep is generated. This feature is provided so that the cleaning system 20 can be used even if one or more of its actuators is not working. The user can operate manual draw levers by looking at the level position LEDs on the control panel and changing the lever positions to fit the displayed pattern each time a beep is generated.

When a cycle is over, this routine clears the StepData and DATAOUT variables (to shut the system down) and stores a record of the completed cycle in the non-volatile memory. The format of these records is shown in FIG. 12. However, no record is stored for "drain only" cycles—because drain cycles do not indicate that a cone/shake maker was cleaned.

The STEPIT routine also aborts the cleaning cycle if a clogged drain line condition has persisted for a defined amount of time, and stores a record of the aborted cycle using the same report format as for completed cleaning cycle. However, the record error flags will show that the cycle was aborted because of a clogged drain condition. The pseudocode for the STEPIT routine is shown in Table 16.

ERRORIT Routine

Referring to FIG. 12, there are eight ErrorINT.n counters (also called integrators) which are initially loaded with values from the Setup Data Table (see FIG. 8) whenever a new cleaning cycle is started. These values specify the maximum amount of time that each of eight error conditions will be tolerated before it is considered to be a serious error which will be noted in the log data for the cycle.

This routine is run only once per second, and only when the system is in a full or sanitizing cycle.

When any error condition is detected, the routine which found the error will set a corresponding bit in the ErrorFlag data structure. This routine decrements the ErrorINT.n counters for each error detected.

Also, when an error counter reaches zero, a corresponding error flag is set in the ErrorLog data structure so that other routines can make decisions (such as to turn on the buzzer) based on the status of the system. At the end of this routine, the Error Flags are cleared so that the error conditions can be tested anew during the next second of operation. The pseudocode for the ERRORINT routine is shown in Table 17.

TIME TO GO Routine

This routine, which runs once per second, decrements the TimeToGo parameter which is displayed on the control panel whenever a cleaning cycle is being run.

Exemplary Cleaning Cycle

The following is an example of a cleaning cycle using the preferred embodiment to clean a CSD with four syrup lines and one ice cream cone dispenser.

There are five main parts to a full cleaning cycle: (1) first rinse, (2) wash with detergent, (3) second rinse, (4) sanitize, and (5) final drain.

First Rinse

The object of the first rinse is to clear as much shake and cone mix from the machine as possible. To minimize the power line surge when the CSD is started, first the shake product pump is started, and one second later the cone product pump is started.

Water flow is started immediately. After a delay of one second, the water flow is tested for ten seconds to confirm that the water supply can deliver at least nine liters per minute. The test is set up by providing a step with a minimum water flow value, but a don't care (i.e., FFH) value for the specified maximum water flow.

As the water level in the mix tank rises, the water level will rise above the inlet for the syrup line pumps 80-88 and these lines will be filled with water.

For about a minute and a half, the cone and shake freezer barrels are filled with all draw valves shut. Since the system allows the syrup lines and draw valve actuators to be connected randomly to the CSD, the next step is to match syrup lines with actuators. To do this, each shake draw valve actuator is opened up, one at a time. First the pressure in the syrup line is allowed to stabilize for several seconds (with StepData.Assign=0) and then the draw valve is kept open for another second or two with the StepData.Assign=1), so that the ASSIGN routine will determine which syrup line pump is connected to each of the shake draw valve actuators. The assignment process is repeated for each shake draw valve. If there any serious leaks, or any clogged lines, no assignment can be made.

During most operations, the spinners in the shake draw valve are activated by setting StepData.K1 equal to 1.

Then the following process is repeated four times: all the draw valves are closed for several seconds to build pressure in the freezers; then each valve is opened for 12 seconds in turn with StepData.Test=1 so that the integrity of the syrup lines is tested. Also, during the fourth repetition, the water valve is closed so that the mix tank will be drained. Then a drain operation is performed to prepare for the wash subcycle.

Drain Operations

During this and every other drain operation, the follow sequence is used. First, all the draw valves are closed for a few seconds, with StepData.K1=0, to allow the spinner relays to unlatch. Then all draw valves are opened with the spinners off (StepData.K1=0) to allow the shake freezer to drain without back pressure from the spinners. Because there may still be a large amount of water in the freezers, and there is now no back pressure at the draw valves from the spinners, the draw valves are periodically closed to allow the drain pump 104 to catch up and to avoid overflowing the drain pan 100. As the water level in the tank drops, the water level will drop below the inlet to the syrup line pumps 80-88, and the syrup lines will be cleared with air.

Wash Subcycle

The wash sub-cycle starts with a half minute mix tank fill, followed by two "fill and flush" cycles, a "fill and soak" cycle, followed by two more "fill and flush" cycles, and a final "fill and soak" cycle. Like the first rinse, each flush starts by blasting a different draw valve, but then the remaining three draw valves are opened simultaneously.

The soak periods last for one minute each and allow the cleaning solution to penetrate, under pressure (i.e., with the draw valves closed), those areas inside the freezer where it does not normally go when the pumps and spinners are moving.

After a one second delay from the start of the wash cycle, the water inlet flow is tested again for several seconds to make sure that an adequate supply is being provided.

Throughout the wash cycle, StepData.DetPmp equals 1, and detergent is metered into the mix tank in proportion to the flow of water coming into the tank. During the first half minute, StepData.Alt is set equal to 1 so that detergent is added to the mix tank water at about twice the normal rate to compensate for the dilution caused by the residual water in the freezer barrels. This will result in a higher conductivity reading in the mix tank than just mixing the prescribed volumes of detergent and water, but this effect is accounted for by increasing the upper conductivity limit, StepData.Beta-H during this precharge time. Conductivity is checked during most of the cleaning cycle to confirm that the detergent is at an acceptable concentration. Note that conductivity is not used, in the preferred embodiment, to control the amount of detergent added, so that it can be used as a truly independent cross check of the detergent feeding system.

In the middle of the wash cycle, after water flow through the system has stabilized, the cone and shake mix pumps are tested (by setting both StepData.Flow-L and StepData.Flow-H) to make sure that a reasonable flow rate (e.g., between four and 7.5 liters per minute) is being drawn by these pumps.

The last part of the wash cycle is a drain sequence, with the water valve turned off sufficiently early that the mix tank and freezers should be cleared of detergent solution by the end of the wash cycle.

Second Rinse

The second rinse consists of the steps of filling the freezer barrels with water, one round of draw valve actuation, and a drain.,

Optional Rinse

In some applications and in accordance with health regulations of some countries, it is necessary to rinse the cleaned system after the sanitization cycle. This may be accomplished in the same manner as the rinse cycle after the detergent cycle.

Sanitize Subcycle

The sanitize cycle is basically the same as the wash cycle except that sanitizer is metered into the mix tank instead of detergent. Note that the conductivity level of sanitizer is typically about one fourth the conductivity of detergent, and thus the sanitizer conductivity test levels will be approximately 25 to 30 Beta units lower than the detergent conductivity test levels.

Final Drain

The final drain is similar to the earlier drain operations at the end of the rinse and wash cycles. This time, however, additional time is allowed for the drain pump to clear the drain pan. When the last step of the cleaning cycle is performed, a log of the cycle is stored in the Status Report Log, as shown in FIG. 12.

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For instance, it would be a simple matter to expand the number of pumps and actuators in the preferred embodiment so that the clean in place system could handle even bigger cone/shake dispensers—such as a machine with up to four cone freezers (for different flavored cones) and up to six milk shake flavors.

An even more important alternate embodiment, mentioned briefly above, is that all of a portion of the clean in place system could be incorporated in the same housing as the cone/shake maker. The advantage of a totally integrated embodiment is clear—it saves space and would reduce the cost of a clean in place system by eliminating the moveable cart, reducing the amount of memory needed by eliminating the need for cleaning step programs for several models, reducing the number of pumps and actuators used with small cone/shake makers, and possibly by allowing the use of a single controller for both normal operation and for cleaning tasks.

TABLE 3
PSUEDOCODE FOR TIMER INTERRUPT ROUTINE

| | |
|---|---|
| -- INT2 is called once every 0.4883 milliseconds | |
| -- (2048 X/sec) | |
| Toggle B2 Probe Drive | -- 1 kilohertz square wave |
| If DetPWM ≠ 0 | -- Is Detergent Pump On? |
| Decrement DetPWM | -- DetPWM is pulse width |
| Set DATAOUT0.b6 = 1 | -- turn on Detergent Pump |
| Endif | |
| If DetPWM = 0 | -- If drive pulse is done |
| Set DATAOUT0.b6 = 0 | -- turn off Detergent Pump |
| Endif | |
| If SanPWM ≠ 0 | -- Is Sanitizer Pump On? |
| Decrement SanPWM | -- SanPWM is pulse width |
| Set DATAOUT0.b7 = 1 | -- turn on Sanitizer Pump |
| Endif | |
| If SanPWM = 0 | -- If drive pulse is done |
| Set DATAOUT0.b7 = 0 | -- turn off Sanitizer Pump |
| Endif | |
| If INTCNT.b2 = 0 | -- Test bit 2 of Int counter |
| adr = INTCNT.b5-2 | -- ADC input address |
| If adr < 12 | -- skip adr = 12 to 15 |
| Start ADC with adr | -- initiate conversion |
| Endif | |
| Endif | |
| Decrement INTCNT | -- update Interrupt counter |
| Set B6 = 0 | -- Conductivity Probe drive |
| Send DATAOUT0 to Output0 | -- Sends control signals to |
| Send DATAOUT1 to Output1 | -- output buffers |

TABLE 4
PSUEDOCODE FOR ADC "END OF CONVERSION" INTERRUPT ROUTINE

| | |
|---|---|
| Load ADC result into A | |
| DO CASE INTCNT.b4-2 | -- task depends on ADC input |
| CASE INTCNT.b4-2 = 0 | -- Conductivity Probe, Range 0 |
| PRB0 = PRB0 + A | |
| CASE INTCNT.b4-2 = 1 | -- Conductivity Probe, Range 1 |
| PRB1 = PRB1 + A | |
| CASE INTCNT.b4-2 = 2 | -- Conductivity Probe, Range 2 |
| PRB0 = PRB2 + A | |
| CASE INTCNT.b4-2 = 3 | -- Conductivity Probe, Range 3 |
| PRB1 = PRB3 + A | |
| CASE INTCNT.b4-2 = 4 | -- Temperature Probe |
| IF A < MinTemp | |
| TankTemp = LowTemp_Flag | -- Temp < 0° C. |
| Else | |
| If A > MaxTemp | |
| TankTemp HighTemp_Flag | -- Temp > 99° C. |
| Else | |
| TankTemp = TempTbl(A) | -- 0° C. < Temp < 99° C. |
| Endif | |
| Endif | |
| CASE INTCNT.b4-2 = 5 | -- Detergent Speed Control |
| If DetPump is Supposed to be | |
| Off for this step | |
| Set DATAOUT0.b6 = 0 | |
| DetPWM = 0 | |
| Return | |
| Endif | |
| Call PUMP SPEED(T) | |
| DetPWM = T | |
| Set DATAOUT0.b6 = 1 | |
| CASE INTCNT.b4-2 = 6 | -- Sanitizer Speed Control |

TABLE 4-continued
PSUEDOCODE FOR ADC "END OF CONVERSION" INTERRUPT ROUTINE

| | |
|---|---|
| If SanPump is Supposed to be | |
| Off for this step | |
| Set DATAOUT0.b7 = 0 | |
| SanPWM = 0 | |
| Return | |
| Endif | |
| Call PUMP_SPEED(T) | |
| SanPWM = T | |
| Set DATAOUT0.b7 = 1 | |
| CASE INTCNT.b4-2 = 7 | -- Not Used |
| EndCASE | |
| Return | |
| SUBROUTINE: | |
| PUMP_SPEED(T) | |
| | -- Calculate Drive Pulse Width |
| X = A - PumpSpd | -- A = measured pump speed |
| | -- PumpSpd = target pump speed |
| | -- X = error signal |
| T = Gain1 * PumpSpd | -- T = total for new speed |
| T += Gain2 * X | |
| T += Gain3 * (X - X$_{-1}$) | -- add Gain3 * dX/dt |
| T += Gain4 * (X + X$_{-1}$) | -- add Gain4 * ∫Xdt |
| If T < 0 Set T = 0 | |
| If T > MaxSpd | |
| Set T = MaxSpd | |
| Return | |

TABLE 5
DISPLAY MESSAGE TABLE

| Top Line | Line | |
|---|---|---|
| MODEL NUMBER | | |
| Status Line | Clock Mode: Time and Date | |
| CYCLE STOPPED | TIME HH:MM:SS | |
| RINSE | DATE MM:DD:YY | |
| WASH | | |
| SANITIZE | | |
| DRAIN | | |
| Time To Go Line | | |
| TIME TO GO | | |
| Problem Reports | No Error Reports | |
| MIX PUMP PROBLEM | MIX PUMPS | OK |
| WATER SUPPLY PROBLEM | WATER SUPPLY | OK |
| LOW WATER TEMPETATURE | WATER TEMP | OK |
| SANITIZER PROBLEM | SANITIZER SUPPLY | OK |
| DETERGENT PROBLEM | DETERGENT SUPPLY | OK |
| LEAKING SYRUP LINE | SYRUP LINES | OK |
| CLOGGED SYRUP LINE | DRAIN LINE | OK |
| CLOGGED DRAIN LINE | | |

TABLE 6
PSUEDOCODE FOR CONDUCTIVITY CALCULATION ROUTINE

| | |
|---|---|
| -- Calculates Conductivity, in Beta (logarithmic) units | |
| -- based on measured probe sense values. | |
| -- Do Calculation once per ½ second | |
| If INTCNT.b10-0 ≠ 0 | -- INTCNT decrements 1024 times |
| Return | -- per half second |
| Endif | |
| -- Calculate average probe sense values | |
| PRB0 = PRB0/32 | -- 32 samples are taken for |
| PRB1 = PRB1/32 | -- each probe range during |
| PRB2 = PRB2/32 | -- each calculation period |
| PRB3 = PRB3/32 | |
| If PRB3 Range | -- Range = 75 |
| Abcissa = 60 | |
| A = PRB3 | |
| GoTo Lookup | |
| Endif | |
| If PRB2 ≧ a Range | |
| Abcissa = 40 | |
| A = PRB2 | |
| GoTo Lookup | |

TABLE 6-continued
PSUEDOCODE FOR CONDUCTIVITY CALCULATION ROUTINE

```
Endif
If PRB1 ≧ Range
  Abcissa = 20
  A = PRB1
  GoTo Lookup
Endif
Abcissa = 0
If PRB0 ≧ MinRange         -- Minimum probe value = 35
  A = PRB0
  GoTo Lookup
Endif
-- Very Low Conductivity
Mantissa = PRB0 - MinRange
A = PRB0
GoTo TempComp
Lookup: Mantissa =         -- see Table 7
LogTbl(A)
-- Temperature Compensation at 1.8% per degree Celsius
-- = .36 Betas per degree Celsius
TempComp:
If TankTemp > 0
  T = (TankTemp - 25)*92/256
  Round T up
  Abcissa = Abcissa + T
Endif
Beta = Abcissa + Mantissa
If Beta < 0 Beta = 254     -- Low value flag
If Beta > 100 Beta = 255   -- High value flag
```

TABLE 7
LOGARITHMIC BETA LOOKUP TABLE

| BETA VALUE | PROBE MEASUREMENT |
|---|---|
| −1 | 34 |
| 0 | 36 |
| 1 | 38 |
| 2 | 40 |
| 3 | 42 |
| 4 | 44 |
| 5 | 46 |
| 6 | 49 |
| 7 | 51 |
| 8 | 54 |
| 9 | 56 |
| 10 | 59 |
| 11 | 62 |
| 12 | 65 |
| 13 | 68 |
| 14 | 72 |
| 15 | 75 |
| 16 | 79 |
| 17 | 83 |
| 18 | 87 |
| 19 | 92 |
| 20 | 96 |
| 21 | 101 |
| 22 | 106 |
| 23 | 111 |
| 24 | 117 |
| 25 | 123 |
| 26 | 129 |
| 27 | 135 |
| 28 | 142 |
| 29 | 149 |
| 30 | 157 |
| 31 | 164 |
| 32 | 173 |
| 33 | 181 |
| 34 | 190 |
| 35 | 200 |
| 36 | 210 |
| 37 | 220 |
| 38 | 231 |
| 39 | 243 |
| 40 | 255 |

TABLE 8
PSUEDOCODE FOR LOGICAL INPUT ROUTINE

```
A = Port A                           -- Keypad and SEL3-0 inputs
If A ≠ LastA                         -- Also, see FIG. 9
  LastA = A
  GoTo INPUT1
Endif
-- Acknowledge user pushing Keypad
If ( A.b7-4 .AND. (.NOT. VALIDIN0.b7-4) ) ≠ 0
  Turn on Beeper for 10 milliseconds
  DataChange0.b7-4 = A.b7-4 .AND. (.NOT. VALIDIN0.b7-4)
Endif
VALIDIN0 = A                         -- Store new validated inputs
LastA = A
INPUT1:                              -- VALIDIN1: Pressure Switch Signals
RAWIN1 = pressure switch signals
Loop for I = 0 to 5
  If RAWIN1.bI = 1                   -- Switch on?
    If Integrator.I < 24             -- Integrator at Max?
      Increment Integrator.I         -- bump integrator
    If Integrator.I = 24             -- Int just now at Max?
      VALIDIN1.bI = 1                -- set flags
      DataChange1.bI = 1
    Endif
  Endif
  Else                               -- Switch off
    If Integrator.I > 0              -- Integrator at Min?
      Decrement Integrator.I         -- bump integrator
    If Integrator.I = 0
      VALIDIN1.bI = 0 -- at Min?
    Endif
  Endif
EndLoop
```

TABLE 9
PSUEDOCODE FOR FLOW ROUTINE

| | |
|---|---|
| -- Do Calculation once per ½ second | |
| If INTCNT.b10-0 ≠ 0 Return | -- INTCNT decrements 1024 times |
| | -- per half second |
| FLOWTOT = FLOWTOT + FLOWCNT | -- Total amount of water |
| | -- used in this cycle |
| If FLOWCNT > 255 FLOWCNT = 255 | -- Clip Flowcnt |
| FLOWRATE = FLOWCNT | -- Flowrate used by other |
| | -- routines |
| FLOWCNT = 0 | -- reset for next |

TABLE 10
PSUEDOCODE FOR SOAP ROUTINE

-- Pump Speed Calibration Constants:
-- DETCAL = 68, DETALT = 120
-- SANCAL = 55, SANALT = 100
If .NOT. CycleOn GoTo LOWSUDS  -- Is a cycle running?
-- safety trap: both pumps cannot be on at the same time
If StepData.DetPmp and StepData.SanPmp GoTo LOWSUDS
If StepData.DetPmp
  Setpoint = DETCAL          -- calibration constant
  If StepData.Alt            -- Alternate speed for
  Setpoint = DETALT          -- precharging mix water
  Endif
  GoTo CALC
Endif
If StepData.SanPmp
  Setpoint = SANCAL          -- calibration constant
  If StepData.Alt            -- Alternate speed for
  Setpoint = SANALT          -- precharging mix water
  Endif
  GoTo CALC
Endif
LOWSUDS: PMPSPD = 0
Return
-- Amount of cleansing chemical added to mix tank is
-- proportional to amount of water added to tank.
CALC: Speed = FLOWRATE * Setpoint / 256
If Speed > 255 Speed = 255
-- Smooth motor speed transitions
PMPSPD = (3*PMPSPD + Speed )/4
Return

TABLE 11
PSUEDOCODE FOR START-CYCLE ROUTINE

| | |
|---|---|
| If VALIDIN0.b6 = 1 GoTo STOP | -- STOP Button |
| If FlagReg.CycleOn = 0 GoTo STOP | -- nothing happening |
| FlagReg = "00010000" .AND. FlagReg | -- clear FlagReg, except |
| | -- FlagReg.Beep |
| If VALIDIN0.b5 GoTo START | -- Start button pushed |
| If VALIDIN0.b6 GoTo SANIT | -- Sanitizer Only |
| Return | |
| SANIT: | |
| FlagReg.Sanit = 1 | -- Set Status = Sanit |
| START: | |
| SetADR = 26*MACHINE − 25 | -- Find Setup address |
| Cyclepointer = SETUP (SetADR + 8) | -- Find first step |
| FLOWTOT = 0 | -- Clear flow counters |
| FLOWCNT = 0 | |
| Clear ErrorLog | -- Clear Error registers |
| Loop for I = 0 to 7 | |
| ErrorINT.I = SETUP (SetADR + 9 + I) | -- max time for error I |
| EndLoop | |
| StepData = 0 | -- Preload StepData |
| StepData.WaterV = 1 | -- get water running |
| StepData.Cycle = 5 | -- cycle type = blank |
| StepData.Beta-L = 254 | -- don't care values |
| StepData.Beta-H = 255 | |
| StepData.Flow-L = 0 | |
| StepData.Flow-H = 255 | |
| StepData.Time = 0 | -- init "step" ends immediately |
| P = Cyclepoint | -- Compute total duration |

TABLE 11-continued
PSUEDOCODE FOR START-CYCLE ROUTINE

| | |
|---|---|
| S = FlagReg.Sanit | -- for this cycle |
| X: If ( .NOT. S .OR. StepTable(P).Sanit ) | |
| TimeToGo = TimeToGo + StepTable(P).Time | |
| Endif | |
| If StepTable(P).Last = 0 | |
| P = P + 8 | |
| GoTo X | |
| Endif | |
| FlagReg.Beep = 1 | -- Start 1 second beep |
| Return | |
| STOP: | -- STOP everything |
| StepData = 0 | -- clear StepData |
| TimeToGo = 0 | |
| DATAOUT0 = 0 | |
| DATAOUT1 = 0 | |
| FlagReg = "11110000" .AND. FlagReg | -- Clear Status except |
| | -- for Mode and Beep |
| Return | |

TABLE 12
PSUEDOCODE FOR WATER ON/OFF ROUTINE

| | |
|---|---|
| If( DATACH.b4 = 1 | -- b4: drain clogged |
| .OR. FlagReg.CycleOn = 0 | |
| .OR. StepData.Water = 0 ) | |
| DATAOUT0.Water = 0 | |
| Return | |
| Endif | |
| If StepData.Water = 1 DATAOUT0.Water = 1 | |
| Return | |

TABLE 13
PSUEDOCODE FOR LEVER ROUTINE

| | |
|---|---|
| -- Note: Draw valves are open (water runs through) when | |
| -- levers are down; draw valves are closed when levers are | |
| -- up. | |
| If Flag.CycleOn = 0 | -- If no cycle is running |
| DATAOUT0.D-levers = 0 | -- disable all down levers |
| DATAOUT1.U-levers = 0 | -- disable all up levers |
| Return | |
| Endif | |
| -- Use StepData from current step | |
| DATAOUT0.D-levers = StepData.levers | |
| DATAOUT1.U-levers = .NOT. StepData.levers | |
| Return | |

TABLE 14
PSUEDOCODE FOR ASSIGN ROUTINE

| | |
|---|---|
| If StepData.Assign = 0 Return | -- Exit if Assign not |
| If FlagReg.CycleOn = 0 Return | -- requested, cycle not |
| If FlagReg.Assigned = 1 Return | -- running, or assign |
| | -- is complete |
| N = Num.ShakeValves | -- from setup table (FIG. 8) |
| B = 0 | -- B = index for active lever |
| Loop for I = 0 to N | |
| If StepData.Lever.I = 1 | |
| If B ≠ 0 | -- Exit if more than one draw |
| Return | -- valve is open |
| Endif | |
| B = I | |

TABLE 14-continued
PSUEDOCODE FOR ASSIGN ROUTINE

```
Endif
EndLoop
-- Text for exactly one low pressure syrup line
-- I = syrup line corresponding to active lever
I = N
A = VALIDIN1.b(N-1)-0
ONE: If A.b(I-1) = 1 GoTo TESTONE
I = I - 1
If I > 0 GoTo ONE
-- there are no open valves: set clogged syrup line flag
LEVERREG.B = 40H          -- 40H indicates clogged
                             syrup line
ErrorFlag.b6 = 1
Return
TESTONE: Mask = FF
Mask.b(I-1) = 0
If (A .AND. Mask) = 0 GoTo ASSIGNIT
-- set flag for leaking syrup line problem
LEVERREG.B = 20H          -- 20H indicates leaking
                             syrup line
ErrorFlag.b5 = 1          -- LEVERREG shown in
                             FIG. 13
Return
ASSIGNIT: StepData.Assign = 0    -- Clear "Assign" Command
LEVERREG.B = I
If N = 1 Goto SUCCESS
-- Test to see if all draw valves have been assigned
Loop for I = 1 to N
If LEVERREG.I = 0 Return  -- at least one is not
EndLoop                   -- assigned
-- Test for duplicate assignments
Loop for I = 1 to N-1
Loop for J = I+1 to N
If ( LEVERREG.I = LEVERREG.J .AND.
LEVERREG.I ≠ 0
LEVERREG.I < N+1 )
-- set "Duplicate Assignment"
LEVERREG.J = LEVERREG.J .OR. 80H
-- set "Leaking Syrup Line" flag
ErrorReg.b5 = 1
Return
Endif
EndLoop
EndLoop
SUCCESS:
ErrorFlag.b5 = 0          -- Assignments successfully
                             completed
ErrorFlag.b6 = 0          -- Clear clogged and leaking
                             line flags
FlagReg.Assigned = 1      -- Set Assigned Flag
Return
```

TABLE 15
PSUEDOCODE FOR ERROR ROUTINE

```
-- Do only when a cycle is running
If FlagReg.CycleOn = 0 Return
If FlagReg.Drain = 1 GoTo DRAINTEST
-- If Drain is clogged skip water flow test
If VALIDIN1.b4 = 1 GoTo TEMPERATURE
-- Water Flow Tests
If StepData.Flow-L ≠ 0          -- 0 = don't care min
If StepData.Flow-H ≠ 255        -- 255 = don't care max
-- Test for Mix Pump Problem
ErrorFlag.b0 = ( FLOWRATE < StepData.Flow-L .OR.
FLOWRATE > StepData.Flow-H)
Else
-- Test for Adequate Water Supply
ErrorFlag.b1 = FLOWRATE < StepData.Flow-L
Endif
Endif
-- Water Temperature Test
TEMPERATURE:
If TANKTEMP < 10 degrees Celcius ErrorFlag.Temp = 1
-- Sanitizer Test
If StepData.SanPmp = 1
ErrorFlag.Sanit = ( BETA < StepData.Beta-L .OR.
BETA > StepData.Beta-H )
Endif
-- Detergent Test
If StepData.DetPmp = 1
ErrorFlag.b4 = ( BETA < StepData.Beta-L .OR.
BETA > StepData.Beta-H )
Endif
-- Syrup Line - Actuator Test
If ( StepData.Test = 0 .OR.     -- Do Test only when
                                   programmed
FlagReg.Assign = 0 )            -- and only if ASSIGN was
GoTo CONETEST                   -- successfully completed
For I = 1 to Num.ShakeValves
A = LEVERREG.I
If A = 0                        -- A is syrup line for Lever I
ErrorFlag.b5 = 1                -- Assignment error
ErrorFlag.b6 = 1                -- set "leaking" flag
                                -- set "clogged" flag
Endif
If StepData.LeverI ≠ VALIDIN1.b(A-1) -- mismatch?
If StepData.LeverI = 0 ErrorFlag.b5 = 1 -- leak
If StepData.LeverI = 1 ErrorFlag.b6 = 1 -- clog
Endif
EndLoop
-- Cone Pressure Line Test: cone line pump should be ON if
CONETEST:                       -- syrup pump #4 is ON
If VALIDIN1.b3 = 1 .AND. VALIDIN1.b5 = 0
ErrorFlag.b6 = 1                -- mark as Clogged Line
Endif
-- Drain Line test
DRAINTEST:
If VALIDIN1.b4 = 0              -- Drain Line Clogged?
ErrorFlag.b7 = 1
Endif
Return
```

TABLE 16
PSUEDOCODE FOR STEPIT ROUTINE

```
If FlagReg.CycleOn = 0 Return    -- Exit if no cycle
If ErrorLog.b7 = 1 GoTo ABORT    -- Clogged Drain?
StepData.Time = StepData.Time - 1
If StepData.Time ≤ 0
If StepData.Last = 1 GoTo ABORT
GoTo NEXT
Endif
Return                           -- Exit if not done with
                                    current step
NEXT:
P = Cyclepoint                   -- pointer to next step in
                                    Step Table
Copy StepTable(P through P+7) into StepData
Cyclepoint = Cyclepoint + 8
-- For Sanitize Only cycles, look for Sanitize step
If FlagReg.Sanit = 0 Return      -- Not a Sanitize cycle?
If StepData.Sanit = 0 .AND. StepData.Last = 0 GoTo NEXT
Return                           -- exit with new step data in
                                    StepData
```

TABLE 16-continued
PSUEDOCODE FOR STEPIT ROUTINE

```
ABORT:
Clear StepData
Clear DATAOUT0 and DATAOUT1
If FlagReg.Drain = 0
Call GetData              -- Put data into storage format
                          -- shown in FIG. 9
Call Logit                -- Store record of cycle in
                             memory
Endif
FlagReg.Beep = 1          -- Set flag for one second beep
Return
```

TABLE 17
PSUEDOCODE FOR ERRORINT ROUTINE

```
-- Do only when a cycle is running
If FlagReg.CycleOn = 0 Return
-- Decrement ErrorINT.I if ErrorFlag.bI is set
-- Set ErrorLog.bI if ErrorINT.I reaches zero
Loop for I = 0 to 7
If -- = 0
ErrorInt = ErrorInt - 1
If ErrorInt ≦ 0 ErrorLog.bI = 1
Endif
EndLoop
-- Clear ErrorFlag for checking during the next second
ErrorFlag = 0
Return
```

What is claimed is:

1. A cleaning system for a fluid product dispenser, said dispenser having means for supplying fluid product to a dispensing valve, said cleaning system comprising:
   (i) a mixing tank for containing treatment solutions;
   (ii) means for delivering pressurized treatment solutions from said mixing tank to the fluid product supply means;
   (iii) means for actuating the dispensing valve to open and close the dispensing valve where said actuating means is responsive to valve open/close signals;
   (iv) means for controlling said cleaning system, said control means generating said valve open/close signals to open and close the dispensing valve a multiplicity of times in accordance with a predefined sequence to release intermittently the pressurized treatment solutions from the fluid product supply means through the dispensing valve.

2. A cleaning system of claim 1 wherein the dispenser includes a dispensing draw valve which is coupled to a flavor supply line to supply a correspondingly flavored fluid product, said cleaning system includes status means for communicating information to the user of said cleaning system, means for pumping rinse/treatment solutions from said mixing tank into the flavor supply line, said pump means including a pressure switch generating a pressure signal indicating whether the solution pressure in the flavor supply line exceeds a predefined pressure limit, said control means includes means for generating an error message on said status means if (a) said pressure signal indicates that the flavor line pressure is below said limit for at least a threshold period of time while the draw valve is closed, or (b) said pressure signal indicates that the line pressure is above said limit for at least a threshold period of time while the draw valve is open, whereby said cleaning system can warn the user of said cleaning system that a flavor line requires repair.

3. A cleaning system of claim 1 wherein said cleaning system includes means for mixing treatment solutions in said mixing tank on the fly, said mixing means including
   a water inlet which maintains a substantially constant liquid level in said mixing tank by letting water flow into said mixing means as treatment solutions are removed from said mixing means by said delivery means,
   means for measuring the amount of water which flows into said mixing tank, and
   means for supplying treatment chemicals to said mixing tank substantially contemporaneously with the flow of water into said mixing tank, the quantity of supplied treatment chemicals being proportional to the amount of water which flows into said mixing tank so as to maintain a predefined concentration level of treatment chemicals in said mixing tank.

4. A cleaning system of claim 3 further including a conductivity probe in said mixing tank for generating a conductivity signal corresponding to the conductivity of the fluid in said mixing tank, wherein said control program, during cleansing tasks, compares said conductivity signal with an allowed conductivity range, and generates an error signal if said conductivity signal is not within said allowed range for at least a threshold period of time.

5. A cleaning system for cleaning a cone/shake dispenser, said dispenser having means for supplying fluid product to a dispensing valve, including at least one freezer, each freezer having a product inlet, a product pump for pumping product into the freezer, the dispensing valve being a draw valve which when opened dispenses product from the freezer, said cleaning system comprising:
   (i) a mixing tank for containing treatment solutions;
   (ii) means for delivering treatment solutions from said mixing tank to the fluid product supply means;
   (iii) means for actuating the dispensing valve to open and close the dispensing valve where said actuating means is responsive to valve open/close signals;
   (iv) means for controlling said cleaning system, said control means generating said valve open/close signals to open and close the dispensing valve a multiplicity of times in accordance with a predefined sequence to release intermittently the treatment solutions from the fluid product supply means through the dispensing valve;
   said delivery means delivering the treatment solutions to the product pump, said control means generating product pump on/off signals to which the product pump is responsive, said control means supplying pressurized treatment solutions in said at least one freezer by generating said product pump on signal.

6. A cleaning system of claim 5 wherein the cone/shake dispenser includes a plurality of shake dispensing draw valves, each coupled to a separate syrup supply line and a common shake freezer, said cleaning system includes separate draw valve actuating means for opening and closing each of said shake dispensing draw valves, said control means including means for generating during rinsing and cleansing tasks, separate said valve open/close signals for opening and closing each said shake dispensing draw valves in accordance with a specified schedule, whereby each draw valve can be opened separately in accordance with said predefined sequence so that the full pressure developed by the shake freezer's product pump is separately applied to each draw valve.

7. A cleaning system of claim 5, wherein said system includes model identifying means for identifying the configuration of a cone/shake dispenser, including the number of freezers and the number of shake dispensing draw valves coupled to the shake freezer, if any, in the cone/shake dispenser; wherein each shake dispensing draw valve is coupled to a separate syrup supply line and a common shake freezer; the number of said draw valve actuating means exceeds the number of draw valves on at least one cone/shake dispenser configuration that can be cleaned by said system; and a plurality of pumps for pumping fluid from said mixing tank into syrup supply lines; at least one of said pumps including means for preventing fluid from being pumped therethrough if said pump is not attached to a syrup supply line; each said pump including a pressure switch for generating a pressure signal indicating whether the pressure on the corresponding syrup line exceeds a predefined pressure limit; said control means including assigning means for separately activating each said draw valve actuating means and then monitoring said pressure signals to determine if said draw valve actuating means is coupled to one of said draw valves, and to find the corresponding syrup line pump; said control program thereby assigning one draw valve actuating means and one pump to each shake dispensing draw valve associated with the configuration of the cone/shake dispenser; means for generating separate draw valve open and close signals for each assigned draw valve actuating means, for opening and closing each shake dispensing draw valve, in accordance with a specified schedule; whereby said cleaning system can clean cone/shake dispensers having a plurality of different configurations.

8. A cleaning system for a cone/shake dispenser having at least one freezer, each freezer having a product inlet, a product pump for pumping product from the product inlet into the freezer, and at least one draw valve for dispensing the product in the freezer, comprising:

water and chemical supply means for routing water from a water supply to a cone/shake dispenser's product pump, including means for routing plain water to the dispenser's product pump during rinse cycles, and for adding cleansing chemicals to water drawn from a water supply and then routing the resulting cleansing solution to the dispenser during wash cycles;

a separate draw valve actuating means for automatically opening and closing each draw valve in the dispenser in response to draw valve open and close signals;

control means coupled to said water and chemical supply means, said draw valve actuating means, and the dispenser's product pump, for controlling the automatic cleaning of the dispenser coupled to said cleaning system, including means for generating a product pump ON to cause the product pump in the dispenser to pump water and cleansing solution through the dispenser, means for automatically initiating rinse and wash cycles in a predefined sequence including means for causing said water and chemical supply means to supply plain water to the dispenser's product pump during rinse cycles and to supply a cleansing solution to the dispenser during wash cycles, and means for generating draw valve open and close signals to open and close each of the dispenser's draw valves a multiplicity of times in accordance with a predefined sequence so as to intermittently release water and cleansing solution from the dispenser and to create agitation in each draw valve in the dispenser for facilitating cleaning of the draw valve;

whereby said cleaning system automatically performs a specified sequence of tasks to clean a cone/shake dispenser.

9. A cleaning system as set forth in claim 8, wherein the cone/shake dispenser includes at least one syrup supply line coupled to a draw valve; said cleaning system further including:

a separate positive displacement pump for each syrup supply line, for supplying water and cleansing solution from said water and chemical supply means to each syrup supply line, said displacement pump having an outlet and pressure switch means on the outlet of said displacement pump for generating a PUMP ON signal when the pressure on the outlet of said displacement pump falls below a predefined pressure level and for generating a PUMP OFF signal otherwise, said positive displacement pump further having on/off control means for turning on said pump only when said pressure switch means generates a PUMP ON signal;

and pump checking means coupled to each said pressure switch means for receiving the PUMP ON and PUMP OFF signals generated by said pressure switch means, including means for generating a SYRUP LINE CLOGGED signal when the draw valve coupled to a syrup line is open and the corresponding pressure switch means generates a PUMP OFF signal for at least a predefined period of time;

whereby said cleaning system automatically checks the integrity of each syrup line in the dispenser while cleaning the dispenser.

10. A cleaning system as set forth in claim 8, wherein said system includes:

model identifying means for identifying the configuration of a cone/shake dispenser, including the number of freezers and the number of shake dispensing draw valves coupled to the shake freezer, if any, in the cone/shake dispenser; wherein each shake dispensing draw valve is coupled to a separate syrup supply line and a common shake freezer;

the number of said draw valve actuating means exceeds the number of draw valves on at least one cone/shake dispenser configuration that can be cleaned by said system; and a plurality of pumps for pumping fluid from said mixing tank into syrup supply lines; at least one of said pumps including means for preventing fluids from being pumped therethrough if said pump is not attached to a syrup supply line; each said pump including a pressure switch for generating a pressure signal indicating whether the pressure on the corresponding syrup line exceeds a predefined pressure limit;

said control means including:

assigning means for separately activating each said draw valve actuating means and then monitoring said pressure signals to determine if said draw valve actuating means is coupled to one of said draw valves, and to find the corresponding syrup line pump; said control program thereby assigning one draw valve actuating means and one pump to each shake dispensing draw valve associated with the configuration of the cone/shake dispenser;

means for generating, during rinse and wash cycles, separate draw valve open and close signals for each assigned draw valve actuating means, for opening and closing each shake dispensing draw valve, in accordance with a specified schedule;

whereby said cleaning system can clean cone/shake dispensers having a plurality of different configurations.

11. A cleaning system as set forth in claim 10, further including status means for communicating status information to the user of said cleaning system;

said control means including means for generating an error message on said status means if (a) any of said pressure signals indicate that the corresponding line pressure is below said limit for at least a threshold period of time while the corresponding draw valve is closed, or (b) any of said pressure signals indicate that the corresponding line pressure is above said limit for at least a threshold period of time while the corresponding draw valve is open.

12. A cleaning system as set forth in claim 10, wherein the cone/shake dispenser may including a cone freezer in fluid connection with a cone dispensing draw valve and a cone pressure line;

said system including a pump for pumping fluid from said mixing tank into said cone pressure line; said pump for said cone pressure line including a pressure switch for generating a pressure signal indicating whether the pressure on the cone pressure line exceeds a predefined pressure limit;

said assigning means including means for monitoring said pressure signal for said cone pressure line to determine which draw valve actuating means is coupled to the dispenser's cone dispensing draw valve if said identified cone/shake dispenser configuration includes a cone freezer;

said control means including means for generating a separate draw valve open/close signal for opening and closing said cone dispensing draw valve, in accordance with a specified schedule.

13. A cleaning system as set forth in claim 8, wherein the cone/shake dispenser includes at least one syrup supply line coupled to a draw valve having a spinner for mixing shakes dispensed using the draw valve; each spinner including means for turning the spinner on and off in response to spinner on and off signals;

said control means in said cleaning system further including means for generating spinner on and off signals for turning on the dispenser's spinners while opening the corresponding draw valve to facilitate the cleaning of the draw valve; and said cleaning system including a separate pump for each syrup supply line, for supplying water and cleansing solution from said water and chemical supply means to each syrup supply line, said pump having an outlet and pressure switch means on the outlet of said pump for generating a PUMP ON signal when the pressure on the outlet of said pump falls below a predefined pressure level and for generating a PUMP OFF signal otherwise, said pump further having on/off control means for turning on said pump only when said pressure switch means generates a PUMP ON signal.

14. A cleaning sytsem as set forth in claim 8, wherein said water and chemical supply means includes flow meter means for generating a water flow signal corresponding to amount of water flowing through said cleaning system;

and product pump check means, coupled to said flow meter means, for monitoring the pumping ability of each of the product pumps in the dispenser by monitoring said water flow signal generated by said flow meter means, including means for calculating a flow rate value from said water flow signal during a predefined time period and for generating a PRODUCT PUMP PROBLEM signal if said calculated flow rate is less than a predefined threshold value;

whereby said cleaning system automatically checks the operability of each product pump in the dispenser while cleaning the dispenser.

15. A cleaning system as set forth in claim 8, wherein said water and chemical supply means includes:

a mixing tank having a usable mixing capacity of no more than two gallons, means for routing water and cleansing solution from said mixing tank to the dispenser, water inlet means for routing water from a water supply into said mixing tank as water and cleansing solution are removed from said mixing means by said routing means, including overflow means for limiting the flow of water into said mixing tank so that the level of fluid in said mixing tank does not exceed a predefined level, an overflow valve for routing water from a water supply into said mixing tank and for limiting the flow of water into said mixing tank so that the level of fluid in said mixing tank does not exceed a predefined level, flow meter means for generating a water flow signal corresponding to amount of water flowing into said mixing tank, chemical feeding means coupled to said flow meter means for supplying cleansing chemical to aid mixing tank substantially contemporaneously with the flow of water into said mixing tank, including means for receiving said water flow signal, and means for adding cleansing chemical to said mixing tank at a rate corresponding to the rate at which water flows into said mixing tank;

whereby a relatively small mixing tank can be used to mix cleansing solution as it is being used to clean the dispenser, avoiding the need to mix large batches of cleansing solution before cleaning the dispenser.

16. A cleaning system as set forth in claim 15, further including a movable housing mounted on wheels for housing said water and chemical supply means and said control means;

whereby said cleaning system can be moved or stored away from a dispenser when said cleaning system is not being used to clean the dispenser, and can be moved into close proximity with a dispenser when said cleaning system is being used to clean the dispenser.

17. A cleaning system as set forth in claim 8, wherein the cone/shake dispenser includes at least one syrup supply line coupled to a draw valve;

said cleaning system further including status means for communicating status information to the user of said cleaning system, and a separate pump for pumping fluid from said water and chemical supply means into each of the dispenser's syrup supply lines, each said pump including a pressure switch for generating a pressure signal indicating whether the pressure on the corresponding syrup line exceeds a predefined pressure limit;

said control means includes means for generating an error message on said status means if (a) any of said pressure signals indicate that the corresponding line pressure is below said limit for at least a threshold period of time while the corresponding draw valve is closed, or (b) any of said pressure signals indicate that the corresponding line pressure is above said limit for at least a threshold period of time while the corresponding draw valve is open;

whereby said cleaning system can warn the user of said cleaning system that a syrup line requires repair.

18. A cleaning system as set forth in claim 8, wherein said water and chemical supply means includes:

a mixing tank having a capacity of less than one tenth the volume of the water and cleansing solution used while cleaning the dispenser, means for delivering water and cleansing solution from said mixing tank to the dispenser, water inlet means for routing water from a water supply into said mixing tank as water and cleansing solution are removed from said mixing means by said delivering means, including overflow means for limiting the flow of water into said mixing tank so that the level of fluid in said mixing tank does not exceed a predefined level, flow meter means for generating a water flow signal corresponding to amount of water flowing into said mixing tank, chemical feeding means coupled to said flow meter means for supplying cleansing chemical to said mixing tank substantially contemporaneously with the flow of water into said mixing tank, including means for receiving said water flow signal, and means for adding cleansing chemical to said mixing tank at a rate corresponding to the rate at which water flows into said mixing tank; the quantity of said cleansing chemical added to said mixing tank being proportional to the amount of water which flows into said mixing tank so as to maintain a predefined concentration level of treatment chemicals in said mixing tank;

whereby a relatively small mixing tank can be used to mix cleansing solution as it is being used to clean the dispenser, avoiding the need to mix large batches of cleansing solution before cleaning the dispenser.

19. A cleaning system as set forth in claim 18, further including:

a conductivity probe inside said mixing tank for generating a conductivity signal corresponding to the conductivity of the fluid in said mixing tank;

and cleansing concentration checking means coupled to said conductivity probe for comparing said conductivity signal with a predefined allowed conductivity range during predefined portion of time during which said cleaning system is cleaning the dispenser, and generating an error signal if said conductivity signal is outside said allowed range for at least a threshold period of time.

20. A cleaning system for a frozen confection dispenser having at least one freezer, each freezer having a product inlet and a product pump for pumping product from the inlet into the freezer, and at least one draw valve for dispensing the product in the freezer, the product pump including means for turning the product pump on and off in accordance with a product on/off signal; the dispenser including at least one flavor supply line coupled to a draw valve for supplying a flavored liquid to the frozen confection dispensed by the draw valve; said cleaning system comprising:

startup means for generating a startup signal;

water and chemical supply means for routing water from a water supply to a frozen confection dispenser's product pump, including means for routing plain water to the dispenser's product pump during rinse cycles, and for adding cleansing chemicals to water drawn from a water supply and then routing the resulting cleansing solution to the dispenser during wash cycles;

separate draw valve actuating means for opening and closing each of the dispenser's draw valves in response to distinct valve open/close signals;

a separate pump for each flavor supply line, for supplying water and cleansing solution from said water and chemical supply means to each flavor supply line, said pump having an outlet and pressure switch means on the outlet of said pump for generating a pressure signal indicating whether the pressure in the flavor supply line exceeds a predefined pressure limit; said pump further having on/off control means for turning on said pump only when said pressure signal indicates that the pressure in the flavor supply line does not exceed said predefined pressure limit; and control means coupled to said startup means, said water and chemical supply means, and each said draw valve actuating means; said control means including preprogrammed computer means for: responding to said startup signal by performing a specified sequence of rinsing and cleansing tasks, including generating a product pump on/off signal to turn on each said product pump, and generating valve open/close signals for opening and closing each of the dispenser's draw valves a multiplicity of times in accordance with a specified schedule so as to create agitation in each draw valve in the dispenser, thereby facilitating cleaning of the draw valves;

whereby said cleaning system can automatically perform a specified sequence of tasks to clean a frozen confection dispenser.

21. A cleaning system as set forth in claim 20, further including status means for communicating status information to the user of said cleaning system;

flavor line problem detecting means for generating an error message on said status means if (a) any of said pressure signals indicate that the corresponding line pressure is below said limit for at least a threshold period of time while the corresponding draw valve is closed, or (b) any of said pressure signals indicate that the corresponding line pressure is above said limit for at least a threshold period of time while the corresponding draw valve is open;

whereby said cleaning system can warn the user of said cleaning system that a flavor supply line requires repair.

22. A cleaning system for a cone/shake dispenser having at least one freezer, each freezer having a product inlet, a product pump for pumping product from the product inlet into the freezer, and at least one draw valve coupled to the freezer for dispensing the product in the freezer, the product pump including means for turning the product pump on and off in response to product pump ON and OFF signals; the dispenser further including a plurality of syrup lines coupled to a corresponding plurality of draw valves (shake dispensing draw valves) coupled to a freezer; said cleaning system comprising:

water and chemical supply means for routing water from a water supply to a cone/shake dispenser's product pump, including means for routing plain water to the dispenser's product pump during rinse cycles, and for adding cleansing chemicals to water from a water supply and then routing the resulting cleansing solution to the dispenser during wash cycles;

separate draw valve actuating means for automatically opening and closing each draw valve in the dispenser in response to draw valve open and close signals;

a separate positive displacement pump for each syrup supply line, for supplying water and cleansing solution from said water and chemical supply means to each syrup supply line, said displacement pump having an outlet and pressure switch means on the outlet of said displacement pump for generating a pressure signal indicating whether the pressure on the corresponding syrup line exceeds a predefined pressure level, said positive displacement pump further having on/off control means for turning on said pump only when said pressure signal indicates that the corresponding line pressure is below said pressure limit; and control means coupled to said water and chemical supply means, each said draw valve actuating means, and the dispenser's product pump, for controlling the automatic cleaning of the dispenser coupled to said cleaning system, including means for generating a product pump ON to cause the product pump in the dispenser to pump water and cleansing solution through the dispenser, means for automatically initiating rinse and wash cycles in a predefined sequence by causing said water and chemical supply means to supply plain water to the dispenser's product pump during rinse cycles and to supply a cleansing solution to the dispenser during wash cycles, and means for generating draw valve open and close signals for each separate draw valve in the dispenser to open and close each of the dispenser's draw valves a multiplicity of times in accordance with a predefined sequence so as to create agitation in each draw valve for facilitating the cleaning of the draw valves;

whereby said cleaning system automatically performs a specified sequence of tasks to clean a cone/shake dispenser.

23. A cleaning system as set forth in claim 22, further including status means for communicating status information to the user of said cleaning system;

said control means including means for generating an error message on said status means if (a) any of said pressure signals indicate that the corresponding line pressure is below said limit for at least a threshold period of time while the corresponding draw valve is closed, or (b) any of said pressure signals indicate that the corresponding line pressure is above said limit for at least a threshold period of time while the corresponding draw valve is open;

whereby said cleaning system can warn the user of said cleaning system that a syrup line requires repair.

* * * * *